United States Patent
Lim et al.

(10) Patent No.: US 11,449,307 B2
(45) Date of Patent: Sep. 20, 2022

(54) REMOTE CONTROLLER FOR CONTROLLING AN EXTERNAL DEVICE USING VOICE RECOGNITION AND METHOD THEREOF

(71) Applicant: SAMSUNG ELECTRONICS CO., LTD., Suwon-si (KR)

(72) Inventors: Chae-young Lim, Bucheon-si (KR); Jong-jin Park, Suwon-si (KR); Min-sup Kim, Suwon-si (KR); Hyun-kyu Yun, Seoul (KR); Won-jae Lee, Seoul (KR); Kyung-ik Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/001,598

(22) Filed: Jun. 6, 2018

(65) Prior Publication Data
US 2019/0012137 A1   Jan. 10, 2019

(30) Foreign Application Priority Data
Jul. 10, 2017   (KR) .................. 10-2017-0087167

(51) Int. Cl.
*G06F 3/16*   (2006.01)
*G10L 25/78*   (2013.01)
(Continued)

(52) U.S. Cl.
CPC .............. *G06F 3/167* (2013.01); *G06F 3/01* (2013.01); *G10L 15/22* (2013.01); *G10L 25/78* (2013.01);
(Continued)

(58) Field of Classification Search
CPC ..... G06F 3/167; G06F 3/01; H04N 21/41265; H04N 21/431; H04N 21/42222;
(Continued)

(56) References Cited

U.S. PATENT DOCUMENTS 5,471,557 A    11/1995  Chung et al.
5,631,669 A *   5/1997  Stobbs ................ G06F 3/03543
                                           345/156
(Continued)

FOREIGN PATENT DOCUMENTS

EP    2 897 126 A1    7/2015
EP    2 960 882 A1   12/2015
(Continued)

OTHER PUBLICATIONS

Communication dated Jul. 31, 2018, issued by the European Patent Office in counterpart European Application No. 18177861.4.
(Continued)

*Primary Examiner* — David D Davis
(74) *Attorney, Agent, or Firm* — Sughrue Mion, PLLC

(57) ABSTRACT

A remote controller for controlling an external device by using voice recognition. The remote controller includes a microphone, at least one sensor, a communication interface, and a processor for controlling the microphone, the at least one sensor, and the communication interface. The controller identifies a user utterance intention based on utterance intention information of the remote controller and utterance intention information of the external device. The controller controls whether to supply power to the microphone according to a result of an identification of the user utterance intention, and controls the communication interface to transmit an electrical signal corresponding to a voice of user received through the microphone to a display device.

19 Claims, 11 Drawing Sheets

(51) Int. Cl.
 *G10L 15/22* (2006.01)
 *G06F 3/01* (2006.01)
 *H04N 21/431* (2011.01)
 *H04N 21/422* (2011.01)
 *H04N 21/41* (2011.01)

(52) U.S. Cl.
 CPC . *H04N 21/41265* (2020.08); *H04N 21/42203* (2013.01); *H04N 21/42222* (2013.01); *H04N 21/431* (2013.01)

(58) Field of Classification Search
 CPC ... H04N 21/42203; G10L 25/78; G10L 15/22; G10L 15/26; G10L 15/28
 See application file for complete search history.

(56) References Cited

U.S. PATENT DOCUMENTS

| | | | |
|---|---|---|---|
| 6,343,269 | B1 | 1/2002 | Harada et al. |
| 8,421,932 | B2 | 4/2013 | Ouchi et al. |
| 8,862,466 | B2 | 10/2014 | Ouchi et al. |
| 9,210,359 | B2 | 12/2015 | Kim et al. |
| 9,268,524 | B2 | 2/2016 | Sakurada et al. |
| 9,431,017 | B2 | 8/2016 | Kojima et al. |
| 9,485,464 | B2 | 11/2016 | Lin et al. |
| 9,747,903 | B2 | 8/2017 | Kojima et al. |
| 9,769,413 | B2 | 9/2017 | Kim et al. |
| 10,102,861 | B2 | 10/2018 | Kojima et al. |
| 10,515,641 | B2 | 12/2019 | Kojima et al. |
| 2005/0202377 | A1* | 9/2005 | Kim .................. G09B 5/06 434/156 |
| 2006/0007151 | A1* | 1/2006 | Ram .................. G06F 3/03543 345/163 |
| 2007/0132733 | A1* | 6/2007 | Ram .................. G06F 3/0227 345/163 |
| 2010/0277579 | A1 | 11/2010 | Cho et al. |
| 2011/0191108 | A1* | 8/2011 | Friedlander .......... G09G 5/00 704/270.1 |
| 2011/0301950 | A1 | 12/2011 | Ouchi et al. |
| 2012/0162540 | A1 | 6/2012 | Ouchi et al. |
| 2012/0215537 | A1 | 8/2012 | Igarashi |
| 2012/0316876 | A1* | 12/2012 | Jang .................. G06F 3/167 704/246 |
| 2013/0021362 | A1 | 1/2013 | Sakurada et al. |
| 2013/0329422 | A1* | 12/2013 | Park .................. G02F 1/133305 362/233 |
| 2014/0111690 | A1* | 4/2014 | Kim ................. H04N 21/42203 348/565 |
| 2014/0223477 | A1 | 8/2014 | Han |
| 2014/0350925 | A1 | 11/2014 | Park et al. |
| 2015/0100322 | A1* | 4/2015 | Lee ................... H04N 5/4403 704/275 |
| 2015/0287411 | A1 | 10/2015 | Kojima et al. |
| 2016/0057374 | A1 | 2/2016 | Kim et al. |
| 2016/0329054 | A1 | 11/2016 | Kojima et al. |
| 2017/0025122 | A1* | 1/2017 | Choi .................... H04M 1/271 |
| 2017/0026700 | A1* | 1/2017 | Choi .................. H04N 21/4432 |
| 2017/0076724 | A1* | 3/2017 | Park .................... G10L 15/063 |
| 2017/0078610 | A1* | 3/2017 | Yang ..................... H04N 5/63 |
| 2017/0154625 | A1* | 6/2017 | Heo .................. H04N 21/4227 |
| 2017/0180646 | A1* | 6/2017 | Kim .................. H04N 5/23219 |
| 2017/0180918 | A1* | 6/2017 | Yang ..................... G08C 17/02 |
| 2017/0323646 | A1 | 11/2017 | Kojima et al. |
| 2018/0367862 | A1 | 12/2018 | Horii et al. |
| 2019/0019518 | A1 | 1/2019 | Kojima et al. |
| 2020/0111498 | A1 | 4/2020 | Kojima et al. |

FOREIGN PATENT DOCUMENTS

| | | |
|---|---|---|
| EP | 3037920 A1 | 6/2016 |
| JP | 2000-338995 A | 12/2000 |
| JP | 2003-233392 A | 8/2003 |
| JP | 3893763 B2 | 3/2007 |
| JP | 2010-68478 A | 3/2010 |
| JP | 2010-217754 A | 9/2010 |
| JP | 4650888 B2 | 3/2011 |
| JP | 2012-133243 A | 7/2012 |
| JP | 4992218 B2 | 8/2012 |
| JP | 2013-25605 A | 2/2013 |
| JP | 2015-201739 A | 11/2015 |
| KR | 10-0202425 B1 | 6/1999 |
| KR | 1020140052154 A | 5/2014 |
| KR | 1020150040445 A | 4/2015 |
| KR | 10-2015-0058027 A | 5/2015 |
| WO | 2017/057010 A1 | 4/2017 |

OTHER PUBLICATIONS

Search Report dated Sep. 21, 2018, issued by the International Searching Authority in International Application No. PCT/KR2018/006081 (PCT/ISA/210).

Written Opinion dated Sep. 21, 2018, issued by the International Searching Authority in International Application No. PCT/KR2018/006081 (PCT/ISA/237).

Communication dated Dec. 13, 2021, issued by the Japan Patent Office in Japanese Patent Machine Application No. 2019-546280.

Communication dated Jul. 29, 2021 issued by the Korean Patent Office in Korean Application No. 10-2017-0087167.

* cited by examiner

REMOTE CONTROLLER FOR CONTROLLING AN EXTERNAL DEVICE USING VOICE RECOGNITION AND METHOD THEREOF

CROSS-REFERENCE TO RELATED APPLICATIONS

This application claims priority from Korean Patent Application No. 10-2017-0087167, filed on Jul. 10, 2017, in the Korean Intellectual Property Office, the disclosure of which is incorporated by reference herein in its entirety.

BACKGROUND

1. Field

The disclosure relates to a remote controller and a method for receiving a user voice of a remote controller, and more particularly, to a remote controller capable of remotely controlling a display device without a voice input button and a method for receiving a user voice of a remote controller.

2. Description of Related Art

A panel key or a remote controller has been widely used as an interface between a display device capable of outputting broadcasting and contents and a user. Alternatively, a user voice or a user motion may be used as an interface between a display device and a user.

With the development of technology, various complicated functions have been employed in a display device (e.g., execution of various applications, games, etc.), so that executing a content, for example, a video downloaded from an external source or Internet browsing, becomes available.

The number of user voice commands increases as various complicated functions are employed in a display device. Accordingly, a remote controller with ease of inputting a user voice has been in high demand.

SUMMARY

Provided are a remote controller capable of remotely controlling a display device without a voice input button and a method for receiving a user voice of a remote controller.

Additional aspects will be set forth in part in the description which follows and, in part, will be apparent from the description, or may be learned by practice of the presented embodiments.

In accordance with an aspect of the disclosure, there is provided a remote controller for controlling an external device by using voice recognition. The remote controller includes a microphone, at least one sensor, a communication interface, and a processor. The processor is configured to control the microphone, the at least one sensor, and the communication interface. The processor is further configured to identify a user utterance intention based on utterance intention information of the remote controller and utterance intention information of the external device. The utterance intention information of the remote controller is based on a state of the remote controller or an external state identified by the at least one sensor. The utterance intention information of the external device is received from the external device through the communication interface. The processor is further configured to control whether to supply power to the microphone according to a result of the identification of the user utterance intention. The processor is further configured to control the communication interface to transmit an electrical signal corresponding to a voice of a user received through the microphone to the external device.

The at least one sensor may include a plurality of sensors, and the processor may be further configured to identify the user utterance intention by combining states identified by the plurality of sensors corresponding to a distance between the remote controller and a face of the user.

The at least one sensor may include at least one from among a grip sensor configured to identify a gripping of the remote controller, a motion sensor configured to identify a motion of the remote controller, and a gas sensor configured to identify gas from an exhalation of the user.

The utterance intention information received from the external device may include information about whether a pop-up guide for guiding a user to utter a voice is displayed on a display of the external device.

The utterance intention information received from the external device may include information about a user utterance history corresponding to a content displayed on a display of the external device.

The utterance intention information received from the external device may include information about whether a subsequent utterance of the user is predicted.

The information about whether the subsequent utterance of the user is predicted may be identified based on at least one from among a previous utterance, contents of a user interface displayed on a display of the external device, and a result of performing an operation or a function of the external device according to the previous utterance.

The processor may be further configured to, in response to identifying that there is a user utterance intention, supply power to the microphone, control the communication interface, and transmit the utterance intention information to the external device, and the external device may be configured to display a user interface with a voice recognition guide on a display.

In accordance with another aspect of the disclosure, there is provided a display device that includes a display, a communication interface and a processor. The processor is configured to control the display and the communication interface. The processor is further configured to control the display to display a content. The processor is further configured to identify a user utterance intention based on information received from a remote controller through the communication interface. The processor is further configured to control the display to display a user interface with a voice recognition guide that is distinguished from the content based on a result of the identifying the user utterance intention.

The processor may be further configured to control the display to display the user interface with the voice recognition guide indicating a state of the remote controller or an external state available for receiving a voice to be distinguished from the content in accordance with the information received from the remote controller through the communication interface.

The processor may be further configured to control the communication interface to transmit an electrical signal corresponding to a user voice to a voice recognition server. The user voice may be received from the remote controller. The processor may be further configured to, based on response information being received from the voice recognition server through the communication interface, control the display to display the response information on the display. The processor may be further configured to, based on control information being received from the voice recognition server through the communication interface, perform a function based on the control information.

In accordance with an aspect of the disclosure, there is provided a method of a remote controller. The method includes connecting to an external device, and identifying a user utterance intention based on utterance intention information of the remote controller and utterance intention information of an external device.

The utterance intention information of the remote controller is based on a state of the remote controller or an external state identified by at least one sensor. The utterance intention information of the external device is received from the external device. The method also includes supplying power to a microphone according to a result of the identifying the user utterance intention, and transmitting an electrical signal corresponding to a user voice received through the microphone to the external device.

The identifying the user utterance intention may include receiving the utterance intention information of the remote controller from within the remote controller and receiving the utterance intention information of the external device from outside the remote controller.

The utterance intention information of the remote controller may be received from within the remote controller by using the at least one sensor or the microphone.

The utterance intention information of the external device may be received from outside the remote controller by using a pop-up guide displayed on the external device or a user utterance history.

The method may further include transmitting the electrical signal corresponding to the user voice input through the microphone to the external device.

In accordance with an aspect of the disclosure, there is provided a non-transitory computer-readable recording medium having recorded thereon a program. The program, when executed by a processor, causes the processor to perform a method of a remote controller. The method includes communicably connecting to an external device, and identifying a user utterance intention based on utterance intention information of a remote controller and utterance intention information of an external device. The utterance intention information of the remote controller is based on a state of the remote controller or an external state identified by at least one sensor. The utterance intention information of the external device is received from the external device. The method also includes supplying power to a microphone according to a result of the identifying the user utterance intention, and transmitting an electrical signal corresponding to a user voice received through the microphone to the external device.

The identifying the user utterance intention may include receiving the utterance intention information of the remote controller from within the remote controller and receiving the utterance intention information of the external device from outside the remote controller.

The utterance intention information of the remote controller may be received from within the remote controller by using the at least one sensor or the microphone.

The utterance intention information of the external device may be received from outside the remote controller by using a pop-up guide displayed on the external device or a user utterance history.

The method may further include transmitting the electrical signal corresponding to the user voice input through the microphone to the external device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
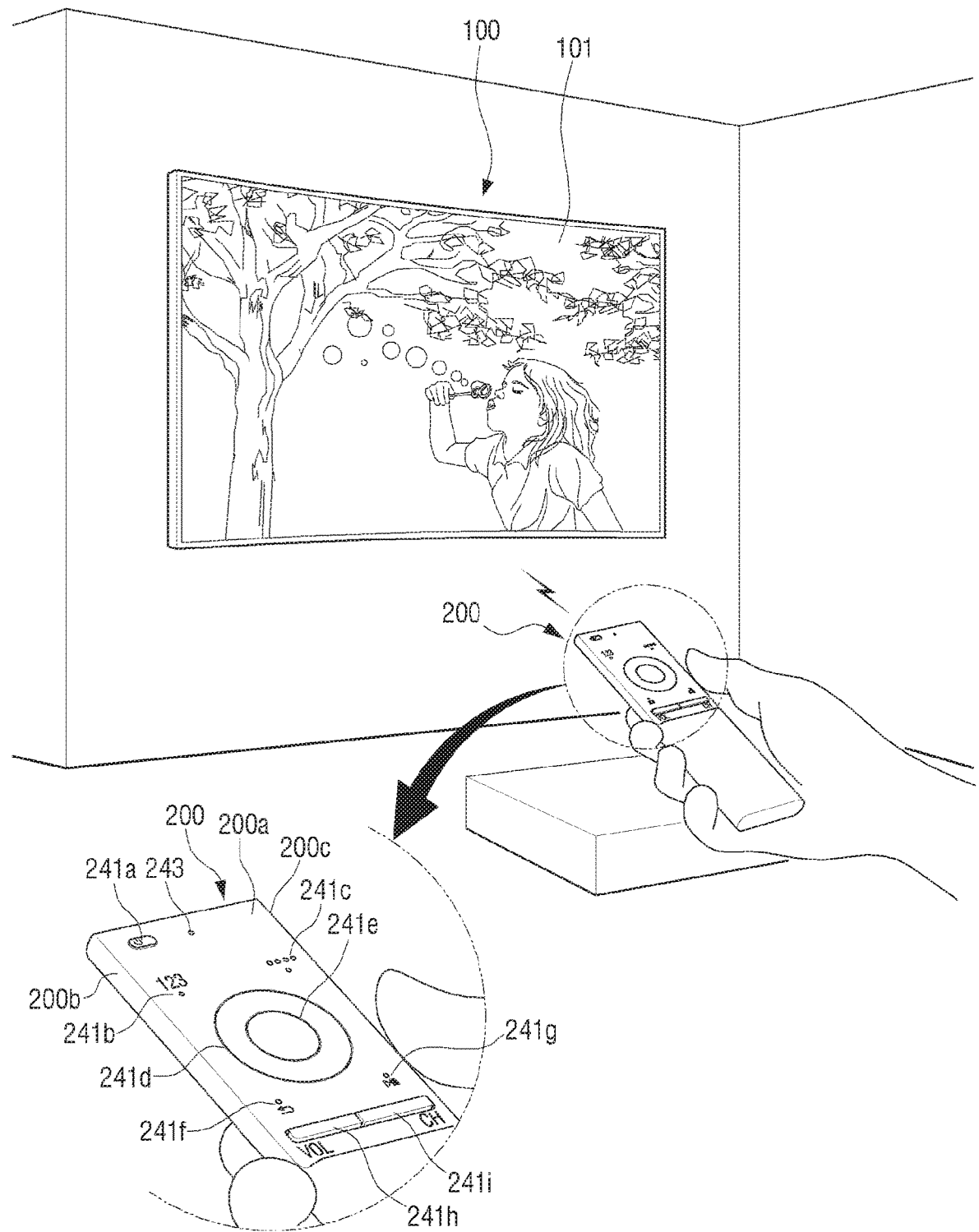
FIG. 1 is a schematic view illustrating an operation between a display device and a remote controller according to an embodiment.

Hereinafter, embodiments will be described in greater detail with reference to the accompanying drawings. In the following description, a configuration which is publicly known but irrelevant to the gist of the present disclosure could be omitted. In addition, with regard to adding the reference numerals to constituent elements of each drawing, it should be noted that like reference numerals in the drawings denote like elements.

The term such as "first" and "second" used in various example embodiments use various elements regardless of an order and/or importance of the corresponding elements, and does not limit the corresponding elements. The terms are used simply to distinguish one element from other elements. For example, the first element may be referred to as the second element and similarly, the second element may be referred to as the first element without going beyond the scope of rights of the present disclosure. The term of "and/or" includes combination of a plurality of related item of one of the plurality of related items.

According to an embodiment, there is provided a remote controller capable of identifying a user utterance intention without a voice input button and a method for receiving a voice of a remote controller.

According to an embodiment, there is provided a remote controller capable of operating a microphone in accordance with various user utterance intentions without a voice input button and a method for receiving a voice of a remote controller.

According to an embodiment, there is provided a remote controller capable of operating a microphone in accordance with received user utterance intention information without a voice input button and a method for receiving a voice of a remote controller.

According to an embodiment, there is provided a remote controller capable of operating a microphone in accordance with one of internal user utterance intention and external user utterance intention without a voice input button and a method for receiving a voice of a remote controller.

According to an embodiment, there is provided a remote controller capable of easily receiving a user voice without a voice input button and a method for receiving a voice of a remote controller.

According to various embodiments of the present disclosure, there is provided a remote controller capable of receiving a user voice without a voice input button and a method for receiving a voice of a remote controller.

According to an embodiment, selecting a button (or a key) of a remote controller 200, as shown in FIG. 1, may refer to pressing or touching a button (or a key).

User input may refer to at least one of, for example, selecting a button (or a key) of the remote controller 200 by a user, pressing a button (or key) of the remote controller 200 by a user, touching a button of the remote controller by a user, a touch gesture input to the remote controller 200 by a user, a gripping of the remote controller 200 by a user, moving the remote controller 200 by a user, inputting a user voice through the remote controller 200, inputting a user voice through the display device 100, inputting a user motion through the remote controller 200, and inputting a user motion through the display device 100. However, embodiments are not limited to these examples.

According to an embodiment, the expression 'a screen of a display device' may encompass a display of a display device. However, embodiments are not limited to this.

The singular expression also includes the plural meaning as long as the context does not imply differently. In this disclosure, terms such as 'include' and 'have/has' should be construed as designating that there are such characteristics, numbers, operations, elements, components, or a combination thereof in the specification, not to exclude the existence or possibility of adding one or more of other characteristics, numbers, operations, elements, components, or a combination thereof.

Like reference numerals in the drawings denote members performing substantially the same function.

FIG. 1 illustrates a display device 100 and a remote controller 200.

Figure 2:
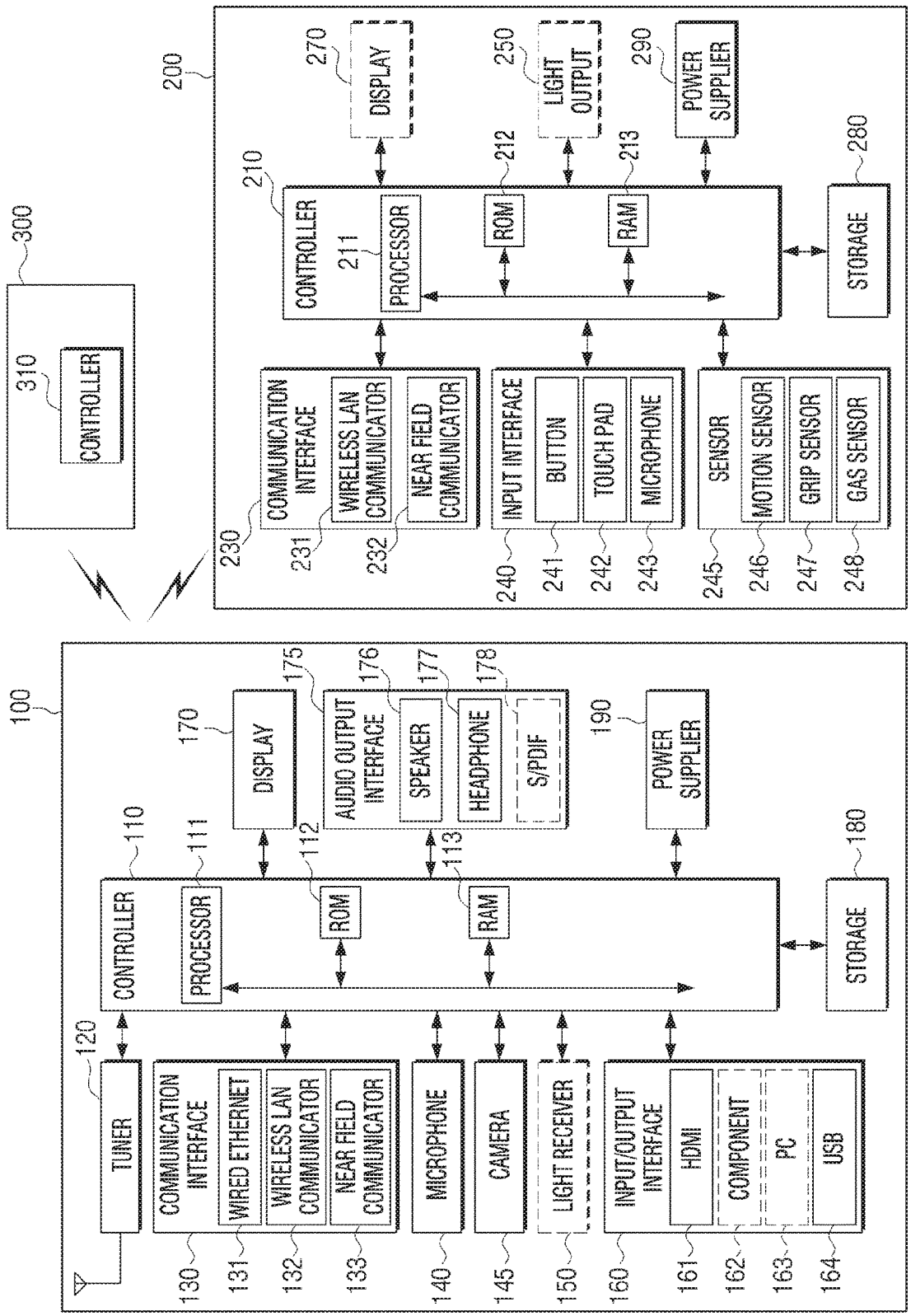
FIG. 2 is a block diagram illustrating a display device and a remote controller according to an embodiment.

The display device 100 capable of outputting a content may receive a user voice by using a microphone 140 as shown in FIG. 2, which is mounted in the display device 100 or connected to the display device 100 in a wired or wireless manner. In addition, the remote controller 200 may receive a user voice by using a microphone 243 as shown in FIG. 2. Examples of 'content' according to an embodiment may include broadcasting, video, image, text, web-document or the combination thereof. Contents may refer to a set of contents.

The remote controller 200 may output (or transmit) control information using infrared communication or near field communication (e.g., Bluetooth, Wi-Fi, etc.) and control the display device 100. In addition, the remote controller 200 may convert the received user voice and transmit the converted user voice to the display device 100 through infrared communication interface or near field communication (e.g., Bluetooth, etc.)

A user may control the display device 100 (e.g., power on/off, booting, channel change, volume control or content replay) by selecting a key (e.g., a button) disposed in a main body (e.g., a front surface 200a, side surfaces 200b and 200c and/or a rear surface) of a remote controller, by touching the remote controller through a user input (e.g., a touch pad or a touch gesture), or by using voice recognition through the microphone 243, or motion recognition (or gripping recognition) through a sensor 245 as shown in FIG. 2.

The user may control the display device 100 through voice utterance (or voice recognition of the uttered voice). The microphone 243 disposed in the main body of the remote controller 200 may receive a user voice to control the display device 100 through the front surface 200a. The remote controller 200 may convert the received user voice into an electronic signal (e.g., a digital signal, digital data, or a packet) and transmit the electrical signal to the display device 100.

The user may control the display device 100 (e.g., power on/off, booting, channel change, volume change or contents replay) by motion recognition through a camera 145 as shown in FIG. 2 attached to the display device 100. In addition, the user may control a screen of the display device 100 by using motion of the remote controller 200 (e.g., by gripping or moving the remote controller 200).

Referring to FIG. 1, the remote controller 200 may include a button 241 (or a key) corresponding to a function and/or an operation of the display device 100. The button 241 may include a physical button that may be depressed or a touch interface button. The remote controller 200 may include a single function button (e.g., 241a, 241b and 241d to 241i) and/or a multifunction button 241c corresponding to a function executed by the display device 100.

The single function button of the remote controller 200 (e.g., a power button 241a) may refer to a button (or a key) to control one of a plurality of functions executed by the display device 100. Most of the function keys of the remote controller 200 may be a single function key.

According to an embodiment, there is no voice button (or voice recognition button) in the remote controller 200. The arrangement order and/or the number of buttons of the remote controller 200 may be increased, changed or reduced in accordance with the function of the display device 100.

A voice recognition server may convert an electrical signal (or, a packet corresponding to an electrical signal) corresponding to a user voice input to the remote controller 200 or the display device 100 into voice data (e.g., text, code, etc.) generated by voice recognition. The voice data may be transmitted to another server (e.g., an interactive server, etc.) through the display device 100 or may be directly transmitted to another server.

An interactive server may convert the voice data into control information (e.g., a control command for controlling the display device 100) recognizable by the display device 100. The control information may be transmitted to the display device 100.

The voice recognition server may be embodied integrally with or separately from the interactive server.

FIG. 2 is a block diagram provided to explain a display device and a remote controller according to an embodiment.

Referring to FIG. 2, the display device 100 which receives an electrical signal corresponding to a user voice from the remote controller 200 may be connected to an external device (e.g., one or more servers) by using a communication interface 130 or an input/output interface 160 in a wired or wireless manner.

The display device 100 which receives an electrical signal corresponding to a user voice from the remote controller 200 may transmit an electrical signal (or a packet corresponding to an electrical signal) received through the communication interface 130 or the input/output interface 160 to the external device (e.g., one or more of servers) connected in a wired or wireless manner. The display device 100 may transmit an electrical signal (or a packet corresponding to an electrical signal) corresponding to a user voice received through the microphone 140 to an external device (e.g., a server) connected in a wired or wireless manner by using the communication interface 130 or the input/output interface 160. Examples of the external device may include mobile phones, smart phones, tablet PCs, table PCs, and PCs.

The display device 100 may include a display 170 and at least one of a tuner 120, a communication interface 130 and an input/output interface 160. The display device 100 may include the display 170 and the combination of the tuner 120, the communication interface 130 and the input/output interface 160. The display device 100 including the display 170 may be electrically connected to a separate electrical device including a tuner.

The display device 100 may be embodied as an analog TV, a digital TV, a 3D TV, a smart TV, an LED TV, an OLED TV, a plasma TV, a monitor, a curved TV having a screen (or a display with a fixed curvature), a flexible TV having a screen with a fixed curvature, a bended TV having a screen with a fixed curvature, and/or a curvature variable type TV capable of changing a screen curvature by using the received user input, or the like, but the present disclosure is not limited thereto.

The display device 100 may include a tuner 120, a communication interface 130, a microphone 140, a camera 145, a light receiver 150, an input/output interface 160, a display 170, an audio output interface 175, a storage 180 and a power supplier 190. The display device 100 may include a sensor (e.g., an illuminance sensor, a temperature sensor or the like) for detecting (or identifying) an internal state of the display device 100 or an external state of the display device 100.

The controller 110 may include a processor chip 111, ROM 112 (or a non-volatile memory) which includes a control program for controlling the display device 100 and RAM 113 (or a volatile memory) which stores signals or data input from an external source or is used as a storage area corresponding to various operations performed by the display device 100.

The controller 110 may control overall operations of the display device 100 or signal flow between internal elements 110 to 190 of the display device 100 and perform processing of data. The controller 110 may control to transmit an electrical signal (or a packet corresponding to an electrical signal) corresponding to the received user voice to a voice recognition server or to receive voice data (or response information) corresponding to an electrical signal (or a packet corresponding to an electrical signal) from the voice recognition server through the communication interface 130. The controller 110 may control to transmit the voice data received through the communication interface 130 to an interactive server or to receive control information corresponding to the voice data from the interactive server.

In response to receiving response information or control information from the voice recognition server through the communication interface 130, the controller 110 may control to display the response information on the display 170 or to perform a function based on the control information.

The controller 110 may control whether to supply power from the power supplier 190 to the internal elements 110 to 190. If a user input is present or predetermined, satisfying the pre-stored conditions, the controller 110 may execute an Operation System (OS) or various applications stored in the storage 180.

The processor chip 111 may further include a graphic processing unit for processing graphics corresponding to images or videos. The processor chip 111 may include the graphic processing unit or the graphic processing unit may be separately embodied. The processor chip 111 may be embodied as system on chip (SoC) including a core and the graphic processing unit. The processor chip 111 may also be embodied as SoC including at least one of the ROM 112 and the RAM 113. The processor chip 111 may include single core, dual core, triple core, quad core, and the like.

The processor chip 111 of the display device 100 may include a plurality of processors. The plurality of processors may include a main processor and a sub-processor operating in a screen off state (or a screen (power) off state with a power plug connected) and/or a sleep state). The plurality of processors may further include a sensor processor for controlling a sensor.

The processor chip 111, the ROM 112 and the RAM 113 may be connected to one another via an internal bus.

According to an embodiment, the expression 'a controller of the display device 100' may refer to all of the processor chip 111, the ROM 112 and the RAM 113 of the display device 100. According to an embodiment, the term 'a controller of the display device 100' may refer to the processor chip 111 of the display device 100. Alternatively, the term 'a controller of the display device 100' may refer to all of the main processor, the sub-processor, the ROM 112 and the RAM 113 of the display device 100.

It would be understood that the configuration and operation of the controller 110 may vary according to an embodiment by a person skilled in the art.

The tuner 120 may select only the frequency of a channel to be received by the display device 100 among a plurality of frequency components by tuning through amplification, mixing or resonance of broadcasting signals received in a wired or wireless manner. The broadcasting signals may include videos, audios and additional data (e.g., electronic program guide (EPG)).

The tuner 120 may receive video, audio and data in a frequency bandwidth corresponding to a channel number (e.g., cable broadcasting channel No. 506) in accordance with user input (e.g., voice, motion, button input, touch input, etc.).

The tuner 120 may receive broadcasting signals from various sources such as terrestrial broadcasting, cable broadcasting, satellite broadcasting, Internet broadcasting, and the like.

The tuner 120 may be integrally embodied with the display device 100 in all-in-one shape, or embodied as a tuner electrically connected to the display device 100 or a separate device including a tuner (e.g., a set-top box or a one-connect device).

The communication interface 130 may connect the display device 100 to the remote controller 200 or the external device by control of the controller 110. The communication interface 130 may transmit an electrical signal (or a packet corresponding to an electrical signal) corresponding to a user voice to a voice recognition server or receive voice data (or response information) corresponding to an electrical signal (or a packet corresponding to an electrical signal) from the voice recognition server by the control of the controller 110. The controller 130 may transmit the received voice data to an interactive server or receive control information corresponding to the voice data from the interactive server by the control of the controller 110.

The communication interface 130 may download an application from an external source or perform web-browsing by the control of the controller 110.

The communication interface 130 may include a wired Ethernet 131, a wireless LAN communicator 132 and a Near Field communicator 133 in accordance with the performance and structure of the display device 100. The communication interface 130 may include the combination of the wired Ethernet 131, the wireless LAN communicator 132 and the Near Field communicator 133.

The wired Ethernet 131 may be connected to a home network (or an office network, etc.) through a wired network cable under the control of the controller 110. The wireless LAN communicator 132 may be wirelessly connected to an access point (AP) under the control of the controller 110. The wireless LAN communicator 132 may include, for example, Wi-Fi. In addition, the Near Field communicator 133 may perform short-distance communication with the remote controller 200 and/or an external device wirelessly without an access point under the control of the control unit 110. The Near Field communication may include, for example, Bluetooth, Bluetooth low energy, infrared data association (IrDA), Ultra-Wideband (UWB), Near Field communication, etc.

The communication interface 130 may receive a control signal transmitted from the remote controller 200. The Near Field communicator 133 may receive a control signal transmitted from the remote controller 200 by the control of the controller 110.

The microphone 140 may receive the uttered user voice. The microphone 140 may convert the received user voice into an electrical signal and output the electrical signal to the controller 110. The user voice may be a voice corresponding to, for example, a user guide, a menu, or a function control of the display device 100. The recognition range of the microphone 140 may vary depending on the volume of the user voice or the ambient environment (e.g., speaker sounds, ambient noises).

The microphone 140 may be embodied integrally with or separately from the display device 100. The microphone 140 separated from the display device 100 may be electrically connected to the display device 100 through the communication interface 130 or the input/output interface 160.

The camera 145 may capture a video (e.g., a series of frames) corresponding to a user motion in a recognition range available for a camera. Examples of the user motion may include, for example, presence of the user (e.g., the user comes up within the recognition range available for the camera), motion of the user using part of user body, for example, face, face look, hand, fist, or finger. The camera 145 may consist of a lens and an image sensor.

The camera 145 may be located at one of the top, bottom, left and right sides of the display deice 100.

The camera 145 may convert a series of captured frames and output the result to the controller 110. The controller 110 may analyze a series of captured frames and recognize a motion of the user. The controller 110 may display a guide or a menu on the display device 100 based on the result of recognizing the user motion or perform a control operation (e.g., channel adjustment, volume adjustment, etc.) in accordance with the result of recognizing the user motion.

When the camera 145 includes a plurality of cameras, the controller 110 may receive a three dimensional stop image or a three dimensional motion through the plurality of cameras.

The camera 145 may be embodied integrally with or separately from the display device 100. An electronic device including a separate camera may be electrically connected to the display device 100 through the communication interface 130 or the input/output interface 160.

The light receiver 150 may receive a light signal (including a control signal) output from the remote controller 200 through a light window.

The light receiver 150 may receive a light signal corresponding to user input (e.g., touch, press, touch gesture, voice or motion) from the remote controller 200. A control signal may be extracted from the received light signal. The received light signal and/or the extracted control signal may be transmitted to the controller 110.

The input/output interface 160 may receive a content from the outside of the display device 100 by the control of the controller 110. Examples of the content may include video, image, text or web-document.

The input/output interface 160 may include one of a high-definition multimedia interface (HDMI) port 161, a component input jack 162, a PC input port 163, and a USB input jack 164. The input/output interface 160 may include a combination of the HDMI input port 161, the component input jack 162, the PC input port 163, and the USB input jack 164. It would be easily understood by those skilled in the art that that an element of the input/output interface 160 (e.g., optical cable output) may be added, deleted and/or changed depending on the performance and structure of the display device 100.

The display 170 may display a video included in a broadcasting signal received through the tuner 120 by the control of the controller 110. The display 170 may display response information received through the communication interface 130 by the control of the controller 110.

The display 170 may display a content (e.g., a video) received through the communication interface 130 or the input/output interface 160. The display 170 may output the content stored in the storage 180 by being controlled by the controller 110. The display 170 may display a user interface (UI) for a voice recognition guide to perform a voice recognition task corresponding to voice recognition or a user interface for a voice recognition guide to perform a motion recognition task corresponding to motion recognition. For example, the user interface for a voice recognition guide may include a voice command guide (e.g., recommendation voice data or recommendation guide), and the user interface for a voice recognition guide may include a motion command guide.

The screen of the display device 100 may refer to the display 170 of the display device 100.

The display 170 may be separated from the display device 100. The display 170 may be electrically connected to the display device 100 through the input/output interface 160.

The audio output interface 175 may output audio included in a broadcasting signal received through the tuner 120 by the control of the controller 110. The audio output interface 175 may output audio (e.g., corresponding to voice or sound) input through the communication interface 130 or the input/output interface 160. The audio output interface 175 may output an audio file stored in the storage 180 by the control of the controller 110.

The audio output interface 175 may include a speaker 176, a headphone output terminal 177, an S/PDIF output terminal 178 or the combination of the speaker 176, the headphone output terminal 177 and the S/PDIF output terminal 178.

The storage 180 may store various data, programs or applications for driving and controlling the display device 100 by the control of the controller 110. The storage 180 may store input/output signals or data corresponding to driving of the tuner 120, the communication interface 130, the microphone 140, the camera 145, the light receiver 150, the input/output interface 160, the display 170, the audio output interface 175 and the power supplier 190.

The storage 180 may store a control program for controlling the display device 100 and the controller 110, an application initially provided by a manufacturer or downloaded from an external source, a graphical user interface (hereinafter, referred to as 'GUI') related to an application, an object for providing the GUI (e.g., image text, icon, button, or the like), user information, documents, voice database, motion database or the related data.

The storage 180 may include a broadcasting receiving module, a channel control mode, a volume control mode, a communication control mode, a voice recognition module, a motion recognition module, a light receiver module, a display control mode, an audio control module, an external input control module, a power control module, voice database (DB) or motion database (DB).

Modules and databases may be embodied in the form of software for performing a broadcasting receiving control function, a channel control function, a volume control function, a communication control function, a voice recognition function, a motion recognition function, a light receiving control function, a display control function, an audio control function, an external input control function, or a power control function of the display device. A controller 210 may perform an operation and/or a function of the display device 100 using the software stored in the storage 280.

The storage 180 may store voice data received from a voice recognition server. The storage 180 may store control information received from the voice recognition server. The storage 180 may store control information received from an interactive server.

The storage 180 may store database corresponding to phoneme of a user voice.

The storage 180 may store control information database corresponding to voice data.

The storage 180 may store symbols or texts including videos, images, emoticons, or the like corresponding to visual feedbacks. The storage 180 may store sounds corresponding to auditory feedbacks. The storage 180 may store feedback providing times (e.g., 300 ms) of the feedbacks provided to the user.

The term "storage" according to an embodiment may encompass the storage 180, a storage including the ROM 112, the RAM 113 and SoC of the controller 110, a memory card mounted on the display device 100 (e.g., a micro SD card, a USB memory, etc.), and an external storage connectable to the USB port 164 of the input/output interface 160 (e.g., a USB memory, etc.). Further, the storage may include a nonvolatile memory, a volatile memory, a Hard Disk Drive (HDD), or a Solid State Drive (SSD).

The power supplier 190 may supply power input from an external power source to the internal elements 110 to 190 in the display device 100 by the control of the controller 110. The power supplier 190 may supply power input from one or more of batteries located in the display device 100 to the internal elements 110 to 190 by the control of the controller 110.

At least one of the elements 110 to 190 of display device 100 in FIGS. 1 and 2 may be added, changed or detected (e.g., at least one of boxes in a broken line) corresponding to the performance and/or the type of the display device 100. In addition, it would be easily understood by those skilled in the art that the positions of the elements 110 to 190 vary depending on the performance or the structure of the display device 100.

Referring to FIG. 2, the remote controller 220 which remotely controls the display device 100 may include a controller 210, a communication interface 230, an input unit 240, a light output 250, a display 270, a storage 280 and a power supplier 290. The remote controller 200 which remotely controls the display device 100 may include the controller 210, the communication interface 230, the input unit 240, the light output 250, the display 270, the storage 280 and the power supplier 290. The remote controller 200 may include one of the communication interface 230 and the light output 250. The remote controller 200 may include both the communication interface 230 and the light output 250.

According to an embodiment, the remote controller 200 may refer to an electronic device that remotely controls the display device 100. The remote controller 200 may include an electronic device on which an application for controlling the display device 100 is mounted (or, an application that could be installed after being downloaded from an external source).

The electronic device on which an application for controlling the display device 100 is installed may include a display (e.g., a touch screen, a display panel without a touch panel, or the display 170 of the display device 100). For example, an electronic device having a display may be a mobile phone, a smart phone, a tablet PC, a notebook PC, another display device, a home appliance (e.g., a refrigerator, a washing machine, a cleaner, etc.).

The user may control the display device 100 through the graphic user interface (GUI) provided by the executing application by using a button (e.g., a channel change button).

The controller 210 may include a processor 211, a ROM 212 (or a nonvolatile memory) that stores a control program for controlling the remote controller 200, or a RAM 213 (or a volatile memory) that stores signals or data input from an external source or is used as a storage area for various operations performed by the remote controller 200.

The controller 210 may control the overall operations of the remote controller 200 and signal flow between internal elements 210 to 290 and perform processing of data. The controller 210 may control power supply to the internal elements 210 to 290 by using a power supplier 290.

The expression 'a controller of the remote controller 200' according to an embodiment may encompass the processor 211, the ROM 212 and the RAM 213. The expression 'a controller of the remote controller 200' may refer to the processor 211 or may further refer to one of the ROM 212 and the RAM 213.

The communication interface 230 may transmit a control signal (e.g., a control signal corresponding to power on, or a control signal corresponding to volume change) in accordance with user input (e.g., touch, press, touch gesture, voice or motion) to the display device 100 by the control of the controller 210.

The communication interface 230 may be wirelessly connected to the display device 100 by the control of the controller 210. The communication interface 230 may include at least one of a wireless LAN communicator 231 and a Near Field communicator 232 (e.g., one of the wireless LAN communicator 231 and the Near Field communicator 232, or both the wireless LAN communicator 231 and the Near Field communicator 232).

The communication interface 130 of the remote controller 200 may be substantially the same as the communication interface 130 of the display device 100, and thus any repetition of the description will be omitted.

An input interface 240 may include a button 241 for receiving user input (e.g. touch or press), a touch pad 262 and/or a microphone 243 for receiving the uttered user voice for controlling the display device 100. The input interface 240 may be partially disposed in the remote controller 200 or exposed on the front surface 200a.

The input interface 240 may further include a vibration motor that provides haptic feedback (e.g., converting an electrical signal into mechanical vibration).

The input interface 240 may output an electrical signal (e.g., an analog signal or a digital signal) corresponding to the received user input (e.g., touch, press, touch gesture, voice or motion) to the controller 210.

The button 241 may include buttons 241a to 241i of FIG. 1.

The touch pad 242 may receive user touch or touch gesture. For example, the touch pad 162 may be embodied as a direction key 241d or an enter-key 241e. The touch pad 162 may be disposed on at least one of a front surface, a rear surface and a back surface of the remote controller 200.

The microphone 243 as shown in FIG. 1 of the remote controller 200 may receive the uttered user voice. The microphone 243 may be embodied as one microphone or a plurality of microphones. For example, the microphone 243 may receive a user voice through the front surface 200a of the remote controller 200. The microphone may receive a user voice through the rear surface of the remote controller 200.

The microphone 243 may covert the received user voice and output the converted user voice to the controller 210. The microphone 243 may detect (or identify) user utterance by using sound pressure within a set frequency bandwidth (e.g., 50 to 4,000 Hz) of the user voice.

The controller 210 may generate a control signal (or an electrical signal) corresponding to a user voice and transmit the control signal to the display device 100 through the communication interface 230.

The sensor 245 may detect a state of the remote controller 230 and/or an external state. For example, the sensor 245 for detecting a motion (e.g., rotation, inclination, or movement) of the remote controller 200 may include at least one of a motion sensor 245, a gyro sensor, an acceleration sensor and a geomagnetic sensor. The sensor 245 may include a grip sensor 247 for detecting a gripping of the remote controller 200 or a gas sensor 248 for detecting gas of exhalation of the user (e.g., carbon dioxide ($CO_2$) or carbon monoxide (CO)). The sensor 245 may include a gravity sensor.

The light output 250 may output a light signal (e.g., a control signal) corresponding to user input (e.g., touch, press, touch gesture, voice or motion) by the control of the controller 210. The light signal output from the light output 250 may be transmitted to the light receiver 150 of the display device 100. A remote controller code format used in the remote controller 200 may be one of a remote controller code format for a manufacturer only and a commercial remote controller code format. The remote controller code format may include leader code and data word. The output light signal may be output by being modulated on carrier wave. The control signal may be stored in the storage 280 or generated by the controller 110. The remote controller 200 may include infrared-laser emitting diode (IR-LED).

The remote controller 200 may transmit a control signal corresponding to a user voice to the display device 100 through one of the communication interface 230 and the light output 250.

The controller 210 may transmit a control signal corresponding to a user voice to the display device 100 preferentially through one of the communication interface 230 and the light output 250.

The display 270 may display a broadcast channel number, a broadcast channel name, and/or a display device status (e.g., a screen off, a ready mode, a welcome mode and/or a general mode) displayed on the display device 100. The display 270 may include, for example, a liquid crystal display (LCD) method, an organic light emitting diode (OLED) method, or a vacuum fluorescent display (VFD) method.

The storage 280 may store various data, programs or applications for driving and controlling the remote controller 200 by the control of the controller 110. The storage 280 may store signals or data to be input or output corresponding to driving of the communication interface 230, the light output 250 and the power supplier 290.

The storage 280 store control information corresponding to user input (e.g., touch, press, touch gesture, voice or motion) received by the control of the controller 210 and/or control information corresponding to a motion of the remote controller 200.

The storage 280 may store remote controller information corresponding to the remote controller 200. The remote controller information may include a model name, a unique device ID, a memory level, presence of object data, Bluetooth version, or Bluetooth profile.

The power supplier 290 may supply power to the elements 210 to 290 of the remote controller 200 by the control of the controller 210. The power supplier 290 may supply power from at least one battery disposed in the remote controller 200 to the elements 210 to 290. The battery may be situated between the front surface of the remote controller 200 (e.g., where the button 261 is positioned) and the back surface.

At least one of the elements of the remote controller 200 in FIGS. 1 and 2 may be added or deleted (e.g., at least one of boxes in a broken line) corresponding to the performance of the display device 100. In addition, it would be easily understood by those skilled in the art that the positions of the elements 110 to 190 vary depending on the performance or the structure of the display device 100.

The voice recognition server may receive a packet corresponding to a user voice input to the remote controller 200 or the display device 100 through a communicator. The controller of the voice recognition server may analyze the received packet by using the voice recognition interface and a voice recognition algorithm and perform voice recognition.

The controller of the voice recognition server may convert the received electrical signal (or a packet corresponding to the electrical signal) into voice recognition data including text in the form of a word or a sentence by using a voice recognition algorithm.

The controller of the voice recognition server may transmit voice data to the display device 100 through the communication interface.

The controller of the voice recognition server may convert the voice data into control information (e.g., a control command). The control information may control an operation (or a function) of the display device 100.

The voice recognition server may include control information database. The controller of the voice recognition server may determine control information corresponding to the converted voice data by using the stored control information database.

The voice recognition server may convert the voice data into control information (e.g., the information parsed by the controller 210 of the display device 100) for controlling the display device 100 by using control information database.

The controller of the voice recognition server may transmit control information to the display device 100 through the communication interface.

The voice recognition server may be integrally embodied with the display device 100. A voice recognition server 300 may be separated from the elements 110 to 190 of the display device 100, but may be included in the display device 100. For example, the voice recognition server may be embedded in the storage 180 or may be embodied as a separate storage.

The interactive server may be embodied separately from the voice recognition server. The interactive server may convert the voice data from the voice recognition server into control information. The interactive server may convert the voice data received from one of the voice recognition sever and the display device 100 into control information. The interactive server may transmit the control information to the display device 100.

At least one of the elements of the voice recognition server in FIGS. 1 and 2 may be added or deleted corresponding to the performance of the voice recognition server 300.

Hereinafter, the case of receiving a user voice of a remote controller will be exemplified in detail.

Figure 3:
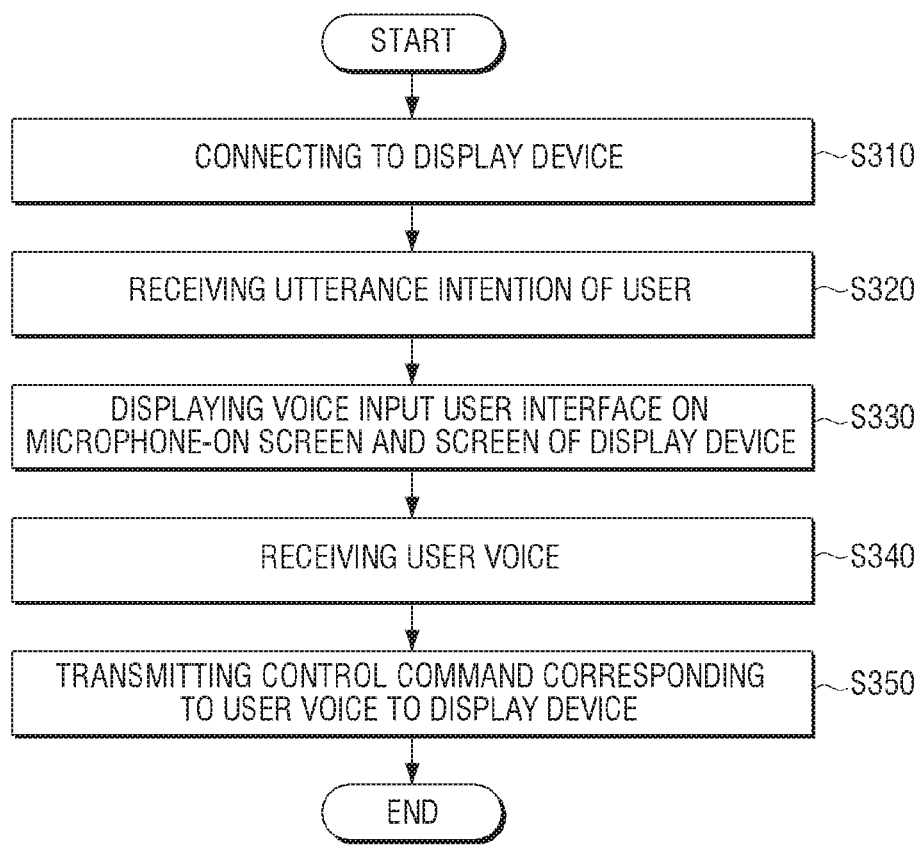
FIG. 3 is a schematic flowchart illustrating a method for receiving a voice of a remote controller according to an embodiment.

FIG. 3 is a schematic flowchart illustrating a method for receiving a voice of a remote controller according to an embodiment.

FIGS. 4A to 4H are schematic views illustrating an example of receiving a user voice of a remote controller according to an embodiment.

At step S310 of FIG. 3, a display device may be connected.

Figure 4A:
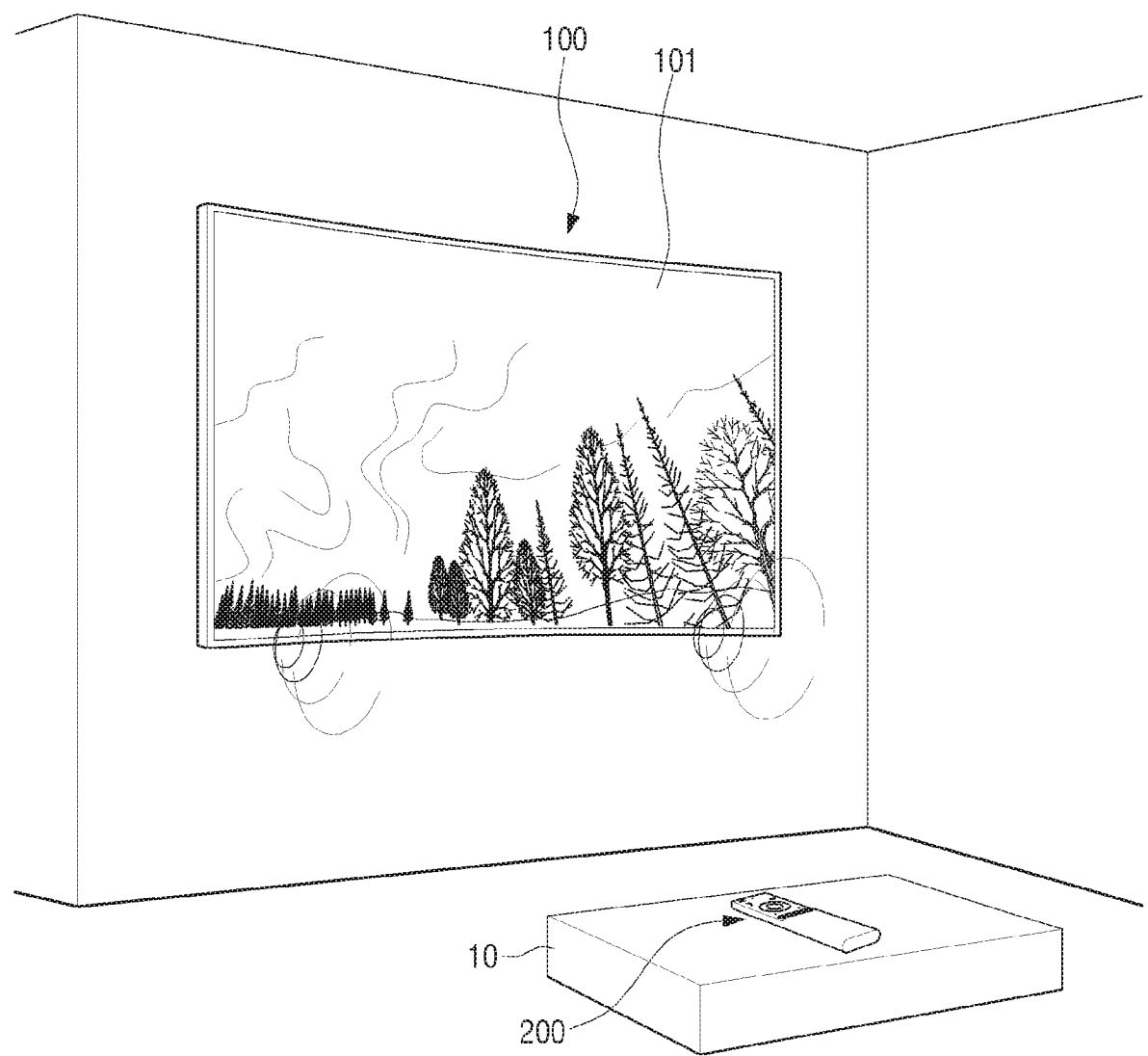
FIGS. 4A to 4H are schematic views illustrating a method for receiving a voice of a remote controller according to an embodiment.

Referring to FIG. 4A, a content 101 (e.g., a broadcasting signal, a video, etc.) may be displayed on the display device 100. The remote controller 200 may be located on a table 10. According to an embodiment, a user does not need to grip (or touch) the remote controller 200 on the table 10.

According to an embodiment, a voice button (or a voice recognition button) may not be disposed on the front surface 200a and/or the side surfaces 200b and 200c of the remote controller 200. A voice button (or a voice recognition button) may not be exposed on the front surface 200a and/or the side surfaces 200b and 200c of the remote controller 200.

Selecting (or pressing or touching) a voice button (or a voice recognition button) may refer to waiting to receive (or preparing) the uttered user voice.

The controller 210 of the remote controller 200 and/or the controller 100 of the display device 100 may supply power to the microphones 243 and 140 by selecting a voice button (or a voice recognition button). The operation state of the remote controller 200 and/or the display device 100 may be changed to a standby state (or a ready state) of a user voice by selecting a voice button (or a voice recognition button).

The display device 100 may be connected to the remote controller 200 in a wireless manner (e.g., the wireless LAN communicator 231 or the Near Field communicator 232). The display device 100 may be connected to a voice recognition server in a wired or wireless manner.

When the display device 100 is initially connected to the remote controller 200, the controller 210 of the remote controller 200 may search for the display device 100 by using the Near Field communicator 232 (e.g., Bluetooth or Bluetooth low energy). The controller 110 of the remote controller 200 may hold an inquiry into the display device 100 and send a request for paging the display device 100 which is inquired. When the display device 100 is initially connected to the remote controller 200, the controller 210 of the remote controller 200 may search for the display device 100 by using the wireless LAN communicator 231.

When the display device 100 is initially connected to the remote controller 200, the display device 100 may search for the remote controller 200 by using at least one of the Near Field communicator 133 (e.g., Bluetooth or Bluetooth low energy) and the wireless LAN communicator 132.

When the display device 100 is connected to the remote controller 200, the display device 100 may transmit and receive a packet including the control information (e.g., a BLE packet or a Bluetooth packet) to and from the remote controller 200.

At step S320 of FIG. 3, user utterance intention may be received.

Figure 4B:
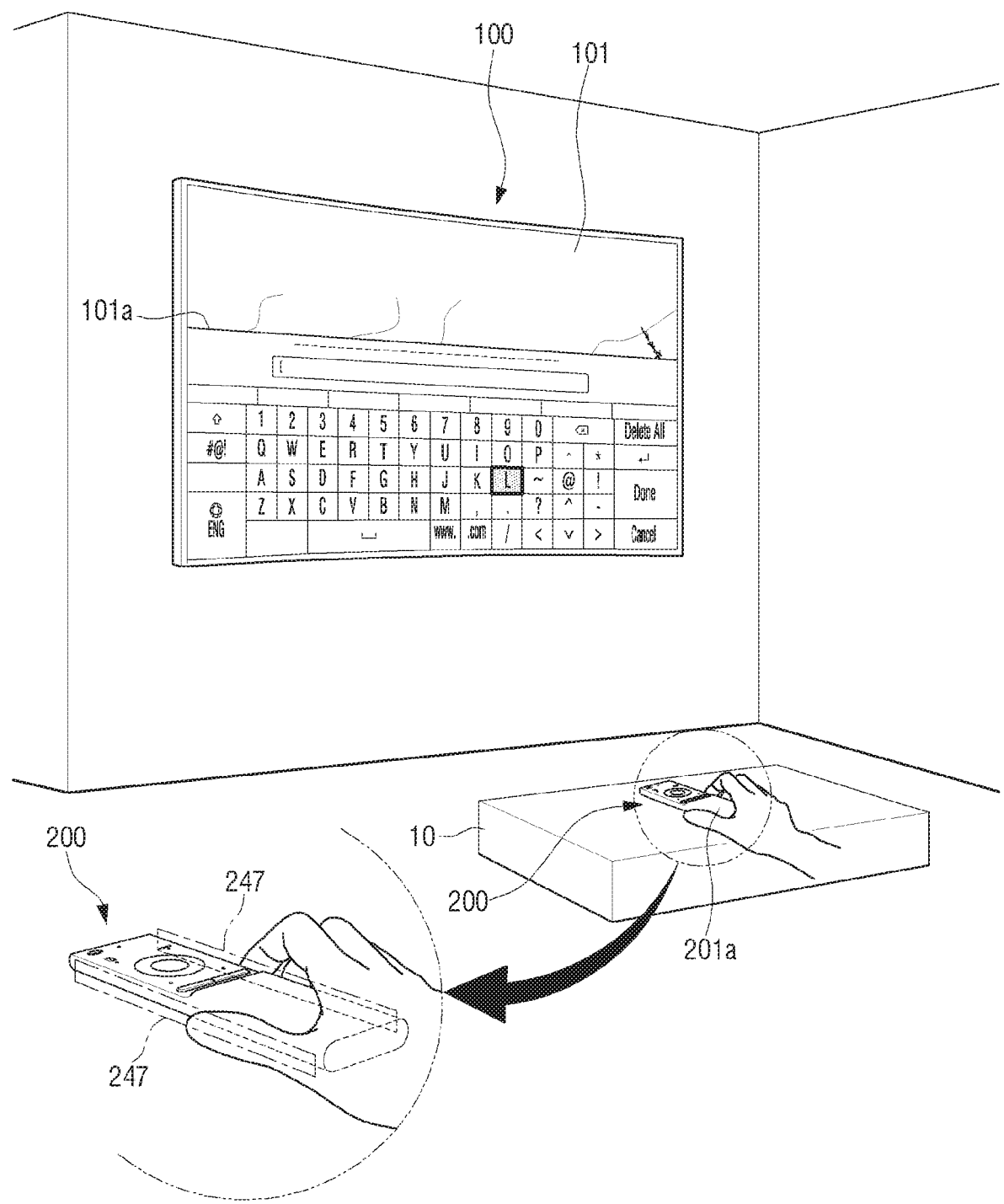
Figure 4C:
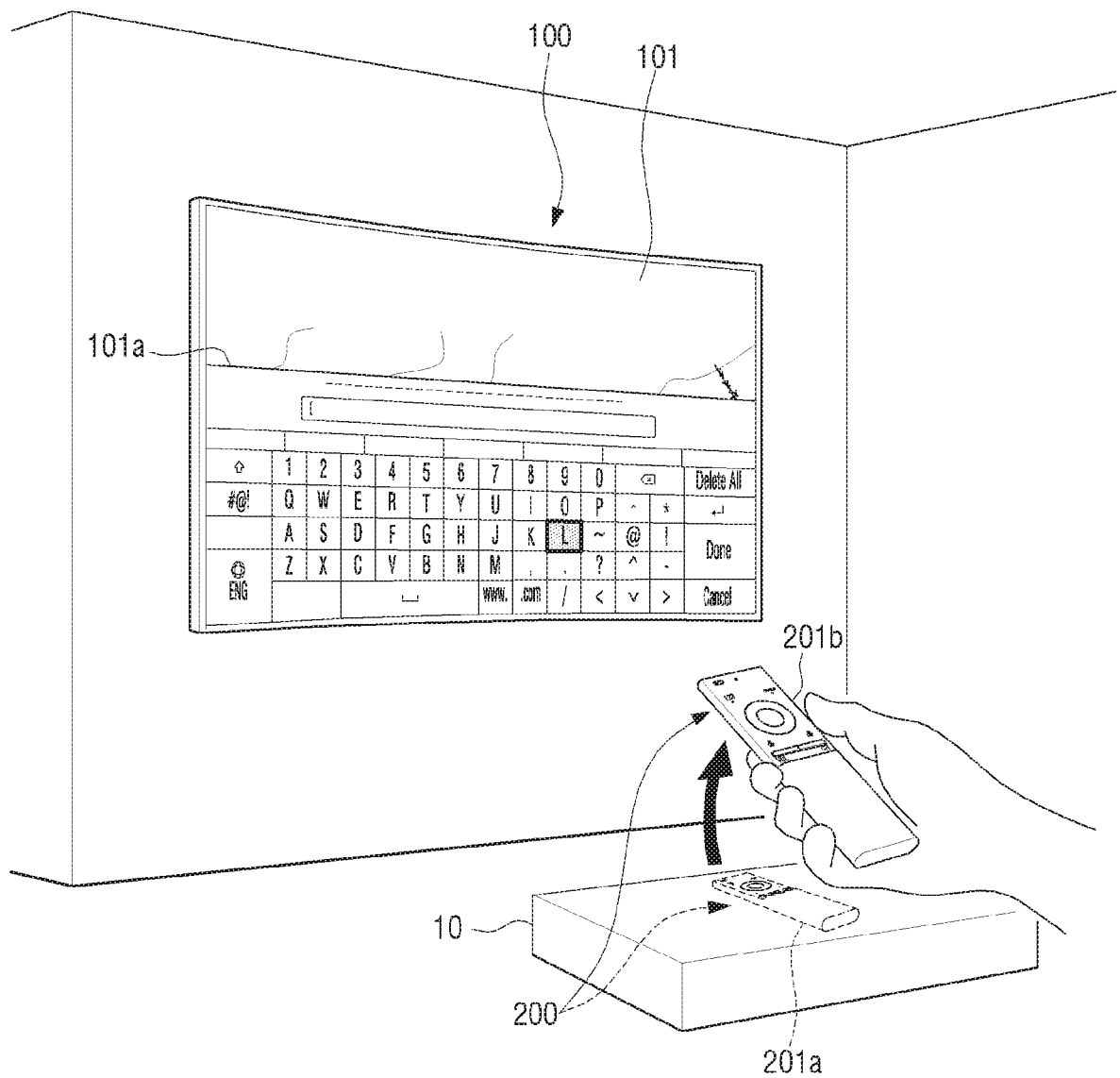
Figure 4D:
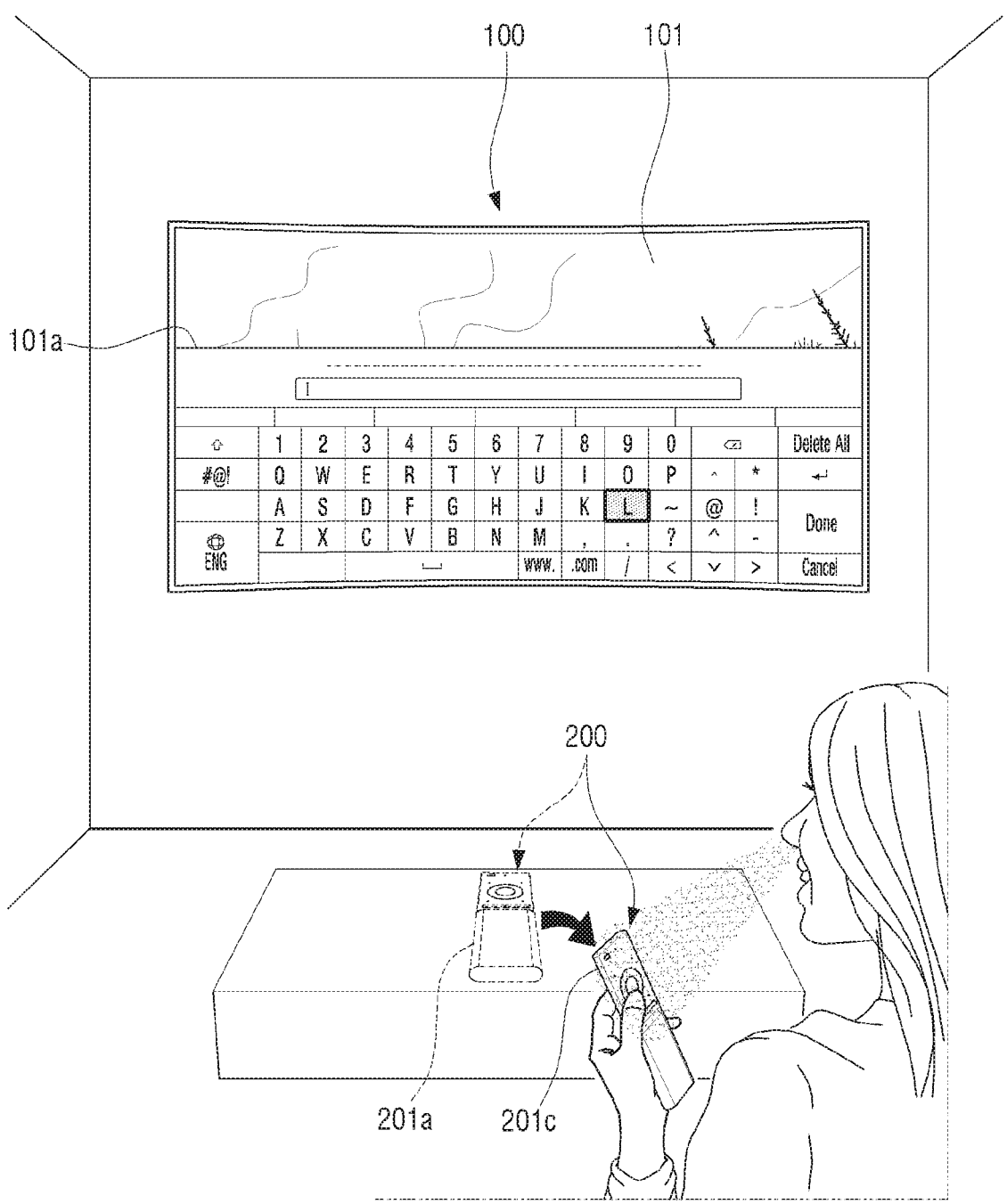
Figure 4E:
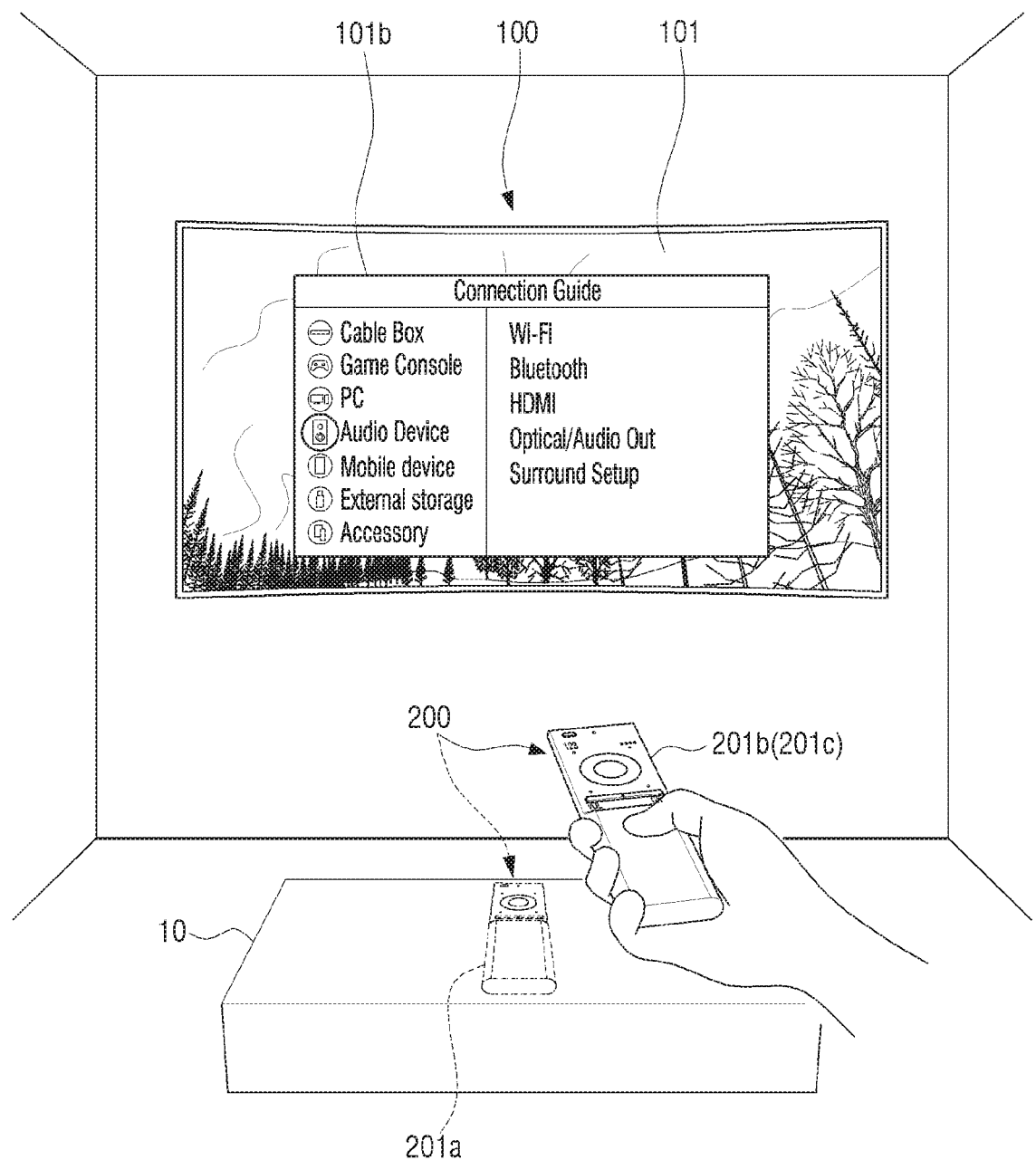

Referring to FIGS. 4B to 4E, a content 101 and a pop-up (e.g., a keyboard pop-up 101a) may be displayed on the display device 100. The pop-up 101a which is separated from the content 101 displayed on the display device 100 (or part of the content 101) may refer to a screen for guiding a user input on the display device 100. The user input may be performed according to the pop-up 101a displayed on the display device 100. For example, a pop-up may include a preference settings pop-up 101b as shown in FIG. 4E.

The user utterance intention may be determined (or identified) based on control information provided from an internal server of the remote controller 200 or an outside of the remote controller 200.

The remote controller 200 may receive user utterance intention through the sensor 245. The remote controller 200 may receive user utterance intention through the microphone 243. The controller 210 of the remote controller 200 may detect user utterance intention by using at least one of the microphone 243 and the sensor 245.

The 'user utterance intention' may refer to a state in which the remote controller 200 capable of controlling the display device 100 receives a user voice through the microphone 243 from a distance. The 'user utterance intention' may refer to a standby state where the remote controller 200 capable of controlling the display device 100 receives a user voice through the microphone 243 from a distance. The 'user utterance intention' may refer to a state before a user utters a voice through the microphone 243 of the remote controller 200 capable of controlling the display device 100 from a distance.

The user utterance intention may be determined based on control information (or status information) received from the sensor 245 of the remote controller 200 and the display device 100. At least one of control information (or status information) received from the sensor 245 of the remote controller 200, which determines (or identifies) user utterance intention by the control of the controller 110 and control information (or status information) received from the display device 100 may be referred to as user utterance intention information. For example, the control information (or status information based on a state detected by a sensor) received from the sensor 245 of the remote controller 200 may be referred to as user utterance intention information (or utterance intention information) based on a state detected by the sensor 245. The control information (or status information) received from the display device 100 may be referred to as user utterance intention information (or utterance intention information) received from an external device.

The controller 210 may detect user utterance intention by using one of a motion sensor 246, a grip sensor 247 and/or a gas sensor 248 which belong to the sensor 245 of the remote controller 200. The above described sensor is an example, but the user utterance intention may be received or detected by using one or more of sensors. The sensor 245 may be related to a distance between the remote controller 200 and a user face (e.g., a long distance, a middle distance and a short distance). For example, the grip sensor 247 may correspond to a long distance between the remote controller 200 and the user face. The motion sensor 246 may correspond to a middle distance between the remote controller 200 and the user face. The gas sensor 248 may correspond to a short distance between the remote controller 200 and the user face.

Referring to FIG. 4B, the user may grip the remote controller 200 on the table 10. The user may grip the controller 200 on the table 10 to utter a voice through the microphone 243 of the remote controller 200. The user may grip the remote controller 200 disposed at a first position 201a on the table 10 with at least one finger of a left hand or a right hand. The user may grip the remote controller 200 at the first position 201a on the table 10 with at least one finger of a left hand or a right hand to utter a voice through the microphone 243 of the remote controller 200.

The grip sensor 247 of the remote controller 200 may receive a gripping (or gripping pressure) from the user. The grip sensor 247 disposed on the side surfaces 200b and 200c of the remote controller 200 may receive a gripping (or gripping pressure) from the user.

The grip sensor 247 may be disposed on at least one of the side surfaces 200b and 200c of the remote controller 200. The grip sensor 247 disposed on at least one of the side surfaces 200b and 200c may be embodied in a strip shape or a plurality of sensors of the grip sensor 247 may be spaced apart from each other.

The grip sensor 247 disposed on the side surfaces 200b and 200c of the remote controller 200 may be positioned downwardly with respect to the direction key 241D (e.g., in the direction opposite to the power button 241A).

The grip sensor 247 disposed on the side surfaces 200b and 200c of the remote controller 200 may transmit an electrical signal corresponding to a gripping (or gripping pressure) from the user to the controller 210. The grip sensor 247 disposed on the side surfaces 200b and 200c of the remote controller 200 may transmit an electrical signal corresponding to the contact by at least one finger of a left hand or a right hand of the user to the controller 210.

The controller 210 of the remote controller 200 may detect a gripping of the user by using an electrical signal received from the grip sensor 247.

The storage 280 may store an analog signal or a digital signal received from the grip sensor 247 by the control of the controller 210. The analog signal or the digital signal stored in the storage may be referred to as "remote controller gripping information". The stored remote controller gripping information may include a remote controller gripping information identifier ID, a sensor identifier ID, a gripping detection time of the remote controller, a gripping detection value (e.g., a voltage or a current) of the remote controller for managing a history.

The remote controller gripping information stored in the first position 201a of the remote controller 200 may be periodically stored until the controller 210 determines a gripping of a user. The remote controller gripping information may be a set of remote controller gripping information stored corresponding to the sensor resolution and/or the detection time interval of the set sensor.

The controller 210 of the remote controller 200 may determine that 'there is an utterance intention by a user' by detecting a gripping of the user.

Referring to FIG. 4C, the user may move the remote controller 200 on the table 10. The user may move the remote controller 200 on the table to utter a voice through the microphone 243 of the remote controller 200. The user may grip and move the remote controller 200 disposed at the first position 201a on the table 10 using at least one finger of a left hand or a right hand. The user may grip and move the remote controller 200 disposed at the first position 201a on the table 10 using at least one finger of a left hand or a right hand to utter a voice through the microphone 243 of the remote controller 200. The user may grip the remote controller 200 disposed at the first position 201a on the table 10 using at least one finger of a left hand or a right hand and move the remote controller 200 to a second position 201b.

The user may grip the remote controller 200 disposed at the first position 201a on the table 10 using at least one finger of a left hand or a right hand and move the remote controller 200 to the second position 201b to utter a voice through the microphone 243 of the remote controller 200.

The motion sensor 246 of the remote controller 200 may detect a motion of the remote controller 200 (e.g., rotation, inclination or movement). The motion of the remote controller 200 may be detect by an acceleration sensor, a geomagnetic sensor, or a gyro sensor as well as the motion sensor 246.

The motion of the remote controller 200 may be periodically detected by the motion sensor 246 (e.g., resolution of the sensor or detection time interval of the set sensor).

The motion sensor 246 may output an analog signal corresponding to a motion of the remote controller 200 to the controller 210. The analog signal output from the motion sensor 245 may be changed into a digital signal by a convertor and output to the controller 210.

The controller 210 of the remote controller 200 may analyze an electrical signal (e.g., an analog signal or a digital signal) received from the motion sensor 246 and determine a motion of the remote controller 200. The controller 210 of the remote controller 200 may analyze an electrical signal (e.g., an analog signal or a digital signal) received from the motion sensor 246 and determine a motion of the remote controller 200 (e.g., distance, speed or change of acceleration, etc.)

The storage 280 may store an analog signal or a digital signal received from the motion sensor 265 by control of the controller 210. The analog signal or the digital signal stored in the storage 280 may be referred to as 'remote controller motion information'. The stored remote controller motion information may include a remote controller motion information identifier (ID), a sensor identifier (ID), an acceleration value detected by a remote controller (e.g., a second axis or a third axis), a motion detection time of a remote controller or distance of the remote controller for managing a history.

The remote controller motion information stored at the first position 201a of the remote controller 200 may be periodically stored until when the remote controller 200 arrives at the second position 201b. The remote controller motion information may be a set of remote controller motion information stored corresponding to the sensor resolution and/or the detection time interval of the set sensor.

The controller 210 of the remote controller 200 may determine whether 'there is an utterance intention by a user' by using one of the grip sensor 247 and the motion sensor 246. The controller 210 of the remote controller 200 may determine whether 'there is an utterance intention by a user' by the combination of a series of the grip sensor 247 and the motion sensor 246.

Referring to FIG. 4D, the user may move the remote controller 200 located on the table 10 to be close to a user's mouth (e.g., within 50 cm, depending on the performance of the microphone 253). The user may move the remote controller 200 on the table 10 to be close to the user's mouth to utter a voice through the microphone 243 of the remote controller 200.

The user may grip the remote controller 200 at the first position 201a on the table 10 by using at least one finger of a left hand or a right hand and move the remote controller 200 to be close to the user's mouth. The user may grip the remote controller 200 disposed at the first position 201a on the table 10 by using at least one finger of a left hand or a right hand and move the remote controller 200 to be close to the user's mouth to utter a voice through the microphone 243 of the remote controller 200.

The user may grip the remote controller 200 disposed at the first position 201a on the table 10 by using at least one finger of a left hand or a right hand and move the remote controller 200 to a third position 201c to be close to the user's mouth. The user may grip the remote controller 200 disposed at the first position 201a on the table 10 by using at least one finger of a left hand or a right hand and move the remote controller 200 to the third position 201c to be close to the user's mouth to utter a voice through the microphone 243 of the remote controller 200. The third position 201c may refer to a position near the user's mouth and gas (e.g., carbon dioxide ($CO_2$)) of exhalation of the user may be detected by the gas sensor 248 at the third position 201c.

The gas sensor 248 of the remote controller 200 that moves to the third position 201c may detect gas of exhalation of the user (e.g., carbon dioxide ($CO_2$)). The gas sensor 248 of the remote controller 200 may detect gas of exhalation of the user (e.g., carbon dioxide ($CO_2$)) at the third position 201c. The gas sensor 248 of the remote controller 200 may detect gas of exhalation of the (e.g., carbon dioxide ($CO_2$)) while the remote controller 200 moves to the third position 201c.

The gas sensor 248 of the remote controller 200 may periodically detect gas (e.g., sensor resolution, or detection time interval of the set sensor).

The gas sensor 248 may output an analog signal corresponding to gas drawn into the remote controller 200 to the controller 210. The analog signal output from the gas sensor 248 may be converted into a digital signal by a converter and the digital signal may be output to the controller 210.

The controller 210 of the remote controller 200 may analyze an electrical signal (e.g., an analog signal or a digital signal) received from the gas sensor 248 and determine gas of exhalation of the user detected by the remote controller 200. The controller 210 of the remote controller 200 may analyze an electrical signal (e.g., an analog signal or a digital signal) received from the gas sensor 248 and determine gas of exhalation of the user detected by the remote controller 200.

The storage 280 may store an analog signal or a digital signal received from the gas sensor 248 by the control of the controller 210. The analog signal or the digital signal stored in the storage 280 may be referred to as 'remote controller gas information'. The stored remote controller gas information may include a remote controller gas information identifier ID, a sensor identifier ID, a name of the detected gas, or a time of detecting gas drawn into the remote controller for managing a history.

The remote controller gas information stored at the first position 201a of the remote controller 200 may be periodically stored until the remote controller 200 arrives at the third position 201c. The remote controller gas information stored at the first position 201a of the remote controller 200 may be periodically stored after the remote controller arrives at the third position 201c. The remote controller gas information may be a set of remote controller gas information stored corresponding to the sensor resolution and/or the detection time interval of the set sensor.

As well as the sensor 248 described above, the sensor 245 may include a distance sensor (e.g., a ultrasonic sensor) for detecting approach (or emergence) of the remote controller 200 by measuring a distance between the remote controller 200 and a user face, and a proximity sensor for detecting approach (or emergence) of the remote controller 200 of the user.

The controller 210 of the remote controller 200 may determine whether 'there is an utterance intention by a user' through the gas sensor 248. The controller 210 of the remote controller 200 may be triggered by one of the grip sensor 247 and the motion sensor 246 and determine whether 'there is an utterance intention by a user' through the gas sensor 248. The controller 210 of the remote controller 200 may determine whether 'there is an utterance intention by a user' by any combination of the grip sensor 247, the motion sensor 246 and the gas sensor 248, according to an embodiment. For example, according to an embodiment, the controller 210 may determine that there is an utterance intention by a user based on only the grip sensor 247. According to an embodiment, the controller 210 may determine that there is an utterance intention by a user based on only the motion sensor 246. According to an embodiment, the controller 210 may determine that there is an utterance intention by a user based on only the gas sensor 248. According to an embodiment, the controller 210 may determine that there is an utterance intention by a user based on all three of the grip sensor 247, the motion sensor 246, and the gas sensor 248. According to an embodiment, the controller 210 may determine that there is an utterance intention by a user based on any two of the grip sensor 247, the motion sensor 246, and the gas sensor 248.

Referring to FIG. 4E, the display device 100 may display the content 101 and a pop-up (e.g., a preference settings pop-up 101b). The user utterance intention may be determined by the internal server 245 of the remote controller 200 or control information received from an external device (e.g., the display device 100).

The controller 110 of the display device 100 may analyze a content displayed on the display 170 and a user's usage pattern (or an utterance history) corresponding to the content. The controller 110 of the display device 100 may determine user utterance intention (or, whether a user utters a voice) based on the result of analyzing the content and the user's usage pattern (or a usage history).

When the display 170 displays the content 101 and the pop-up (e.g., the keyboard pop-up 101a), the controller 110 of the display device 100 may determine whether 'there is an utterance intention by a user'. When the display 170 displays the content 101 and the pop-up (e.g., the preference settings pop-up 101b), the controller 110 of the display device 100 may determine whether 'there is an utterance intention by a user'. The pop-up 101a or the pop-up 101b may be an example embodiment, and a pop-up (or a screen) may be in any form as long as it guides a user to utter a voice.

When a pop-up is displayed on a screen of the display device 100, the controller 110 of the display device 100 may transmit first control information (e.g., a (1-1)th packet) corresponding to the 'pop-up' to the communication interface 230 of the remote controller 200 through the communication interface 130.

The controller 110 of the display device 100 may transmit (or convert and transmit) the first control information (e.g., the (1-1)th packet) corresponding to the 'pop-up' to the remote controller 200 in accordance with the wireless communication standard. In addition, the controller 110 of the display device 100 may control the communication interface 130 to transmit the (1-1)th packet corresponding to the 'pop-up'. The packet may be a packet using the Near Field communication standard.

As well as the above described pop-up, when the display 170 displays a content or a home screen of a smart hub, the controller 110 of the display device 100 may confirm a previous utterance of a user based on a user's usage pattern (or an utterance history).

When one of a plurality of screens included in the content and the home screen of the smart hub is displayed on the display 170, the controller 110 of the display device 100 may confirm whether 'there is a previous utterance by a user'. The total number of display times, the number of user's utterances, and the percentage of utterances (%) may be included in the 'there is a previous utterance by a user'. When a screen corresponding to user's previous utterance is displayed on the screen of the display device 100, the controller 110 of the display device 100 may transmit first control information (e.g., a (1-2)th packet) corresponding to 'user's previous utterance' to the communication interface 230 of the remote controller 200 by using the communication interface 130.

The controller 110 of the display device 100 may transmit (or convert and transmit) the first control information (e.g., the (1-2)th packet) corresponding to the 'user's previous utterance' to the remote controller 200 using the wireless communication standard. The controller 110 of the display device 100 may control the communication interface 130 to transmit the (1-2)th packet corresponding to the 'user's previous utterance'. The packet may be a packet using the Near Field communication standard.

The controller 210 of the remote controller 200 may determine whether 'there is an utterance intention by a user' by combining first control information received from the sensor 245 and an external source. The controller 210 of the remote controller 200 may determine 'whether there is an utterance intention by a user' by combining first control information received from at least one of a plurality of sensors and an external source.

The user utterance intention may be confirmed by not only the remote controller 200 but also the controller 110 of the display device 100.

As step S330 of FIG. 3, a user interface for a voice recognition guide may be displayed on a mic-on screen and a screen of a display device.

Figure 4F:
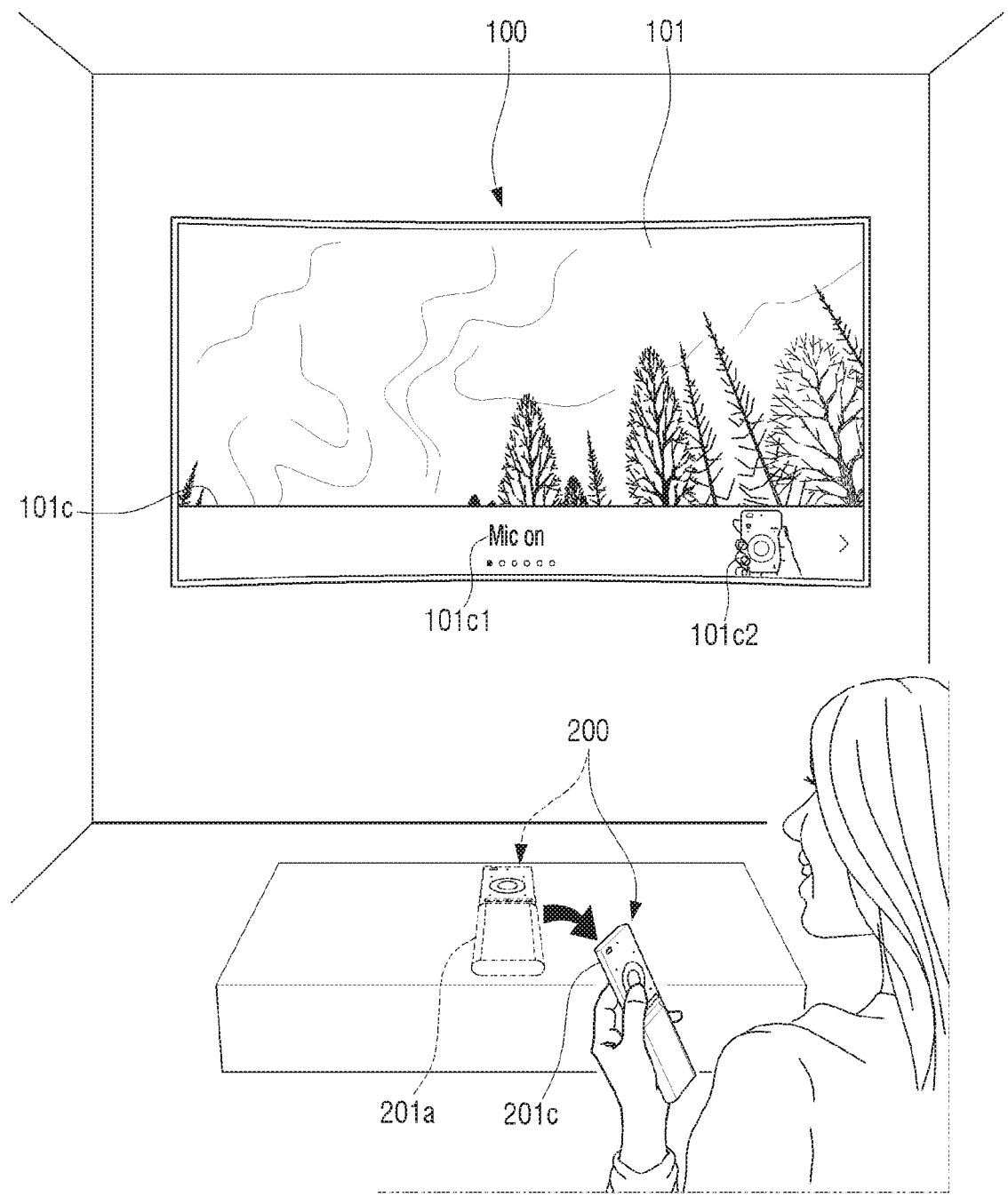

Referring to FIG. 4F, a user interface (or Q-sign (cue sign)) for a voice recognition guide 101c may be displayed on a screen of the display device 100. The controller 210 of the remote controller 220 may supply power to the microphone 243 corresponding to 'confirming of an utterance intention by a user'. The controller 210 of the remote controller 200 may allow the microphone 243 to operate (e.g., receiving the uttered user voice) corresponding to the 'confirming of an utterance intention by a user'. When the microphone 243 does not operate (or power is not supplied to the microphone 243), although the user utters a voice, the microphone 243 may not receive a user voice.

The controller 210 of the remote controller 200 may transmit second control information corresponding to the 'confirming of the utterance intention by a user' to the communication interface 130 of the display device 100 by using the communication interface 230.

The controller 210 may control to display a user interface for a voice recognition guide 101c corresponding to receiving of the second control information of the controller 110.

The user interface for a voice recognition guide 101c may refer to a user interface provided on the screen of the display device 100 to guide a user utterance. For example, when the utterance intention of the user is confirmed, the controller 210 of the display device 100 may provide the user with the user interface for a voice recognition guide 101c including text, image, video or symbol corresponding to 'confirming of an utterance intention by a user'. The user interface for a voice recognition guide 101c may be separated from the content 101 displayed on the screen.

Figure 4G:
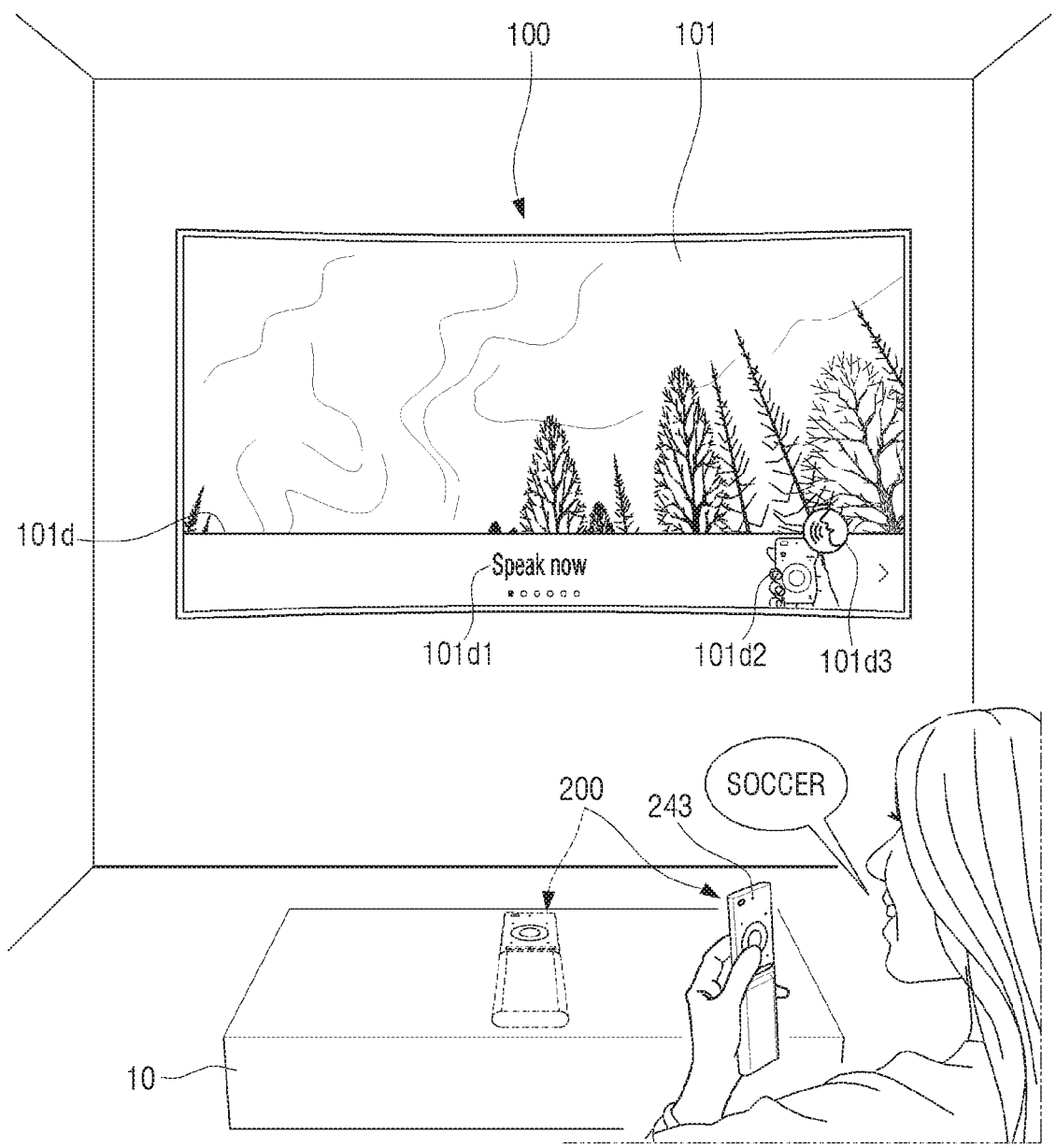

The user interface for a voice recognition guide 101c may include a user guide (e.g., text 101c1 such as 'mic on', image 101c2, video, and/or symbol 101d3 as shown in FIG. 4G) displayed on one side of the user interface for a voice recognition guide 101c. The user guide may include one of text, image, video, and symbol, or any combination thereof.

The user interface for a voice recognition guide 101c may be disposed on one side (e.g., top/bottom/left/right sides) of the display device 100. The user interface for a voice recognition guide 101c may overlap with the content 101 displayed on the screen of the display device 100.

The user interface for a voice recognition guide 101c may have a transparency (e.g., 0% to 100%). Depending on the transparency of the user interface for a voice recognition guide 101c, the content 101 may be blurred. The user interface for a voice recognition guide 101c may be displayed to be distinguished from the content 101 on the screen.

When the user interface for a voice recognition guide 101c is displayed as shortly as possible after a user grips the remote controller 200, the user may be provided with an enhanced user experience. For example, a time T1 from the gripping of the remote controller 200 to the displaying of the user interface for a voice recognition guide 101c may be 1 second or less. In addition, the time T1 from the gripping of the remote controller 200 to the displaying of the user interface for a voice recognition guide 101c may be 3 seconds or less.

At step S340 of FIG. 3, a user voice may be received.

Referring to FIG. 4G, the controller 210 of the display device 100 may display another user interface for a voice recognition guide 101d. When a predetermined time (e.g., 100 ms, changeable) passes after the user interface for a voice recognition guide 101c, the controller 210 of the display device 100 may display another user interface for a voice recognition guide 101d corresponding to receiving of a user voice. Another user interface for a voice recognition guide 101d may include a user guide (e.g., text 101d1 ('speak now'), image 101d2, video or symbol 101d3 as shown in FIG. 4G).

When another user interface for a voice recognition guide 101d is displayed on a screen of the display device 100, the user may utter a voice (e.g., soccer) to the remote controller 200. The remote controller 220 may receive a user voice through the microphone 243. The microphone 243 may convert the received user voice into a signal (e.g., a digital signal or an analog signal) and output the signal to the controller 210. The controller 210 may store the signal corresponding to the received user voice in the storage 280.

When another user interface for a voice recognition guide 101d is displayed as shortly as possible after a user grips the remote controller 200, the user may be provided with the enhanced user experience. For example, a time T2 from the gripping of the remote controller 200 to the displaying of another user interface for a voice recognition guide 101d may be 1.5 seconds or less. In addition, the time T1 from the gripping of the remote controller 200 to the displaying of another user interface for a voice recognition guide 101d may be 3.5 seconds or less.

At step S340 of FIG. 3, when a user voice is not received during a predetermined time (e.g., 5 seconds or less, changeable), the remote controller 200 may block power supplied to the microphone 243 and terminate user voice recognition.

When a subsequent utterance of a user is predicted, a user voice may be continuously received by changing the predetermined time or maintaining to supply power to the microphone regardless of whether the predetermined time passes. Whether the subsequent utterance of the user is predicted or not may be determined based on a previous utterance, contents of a user interface of the display device according to the user utterance, and a result of determining an operation or a function of the display device according to the user utterance.

A display device or an interactive server may determine whether a subsequent utterance of a user is predicted, and the display device may transmit a specific signal (a packet) including the determination result to the remote controller and maintain to supply power or change a predetermine time for maintaining.

At step S350 of FIG. 3, a control signal corresponding to a user voice may be transmitted to a display device.

Figure 4H:
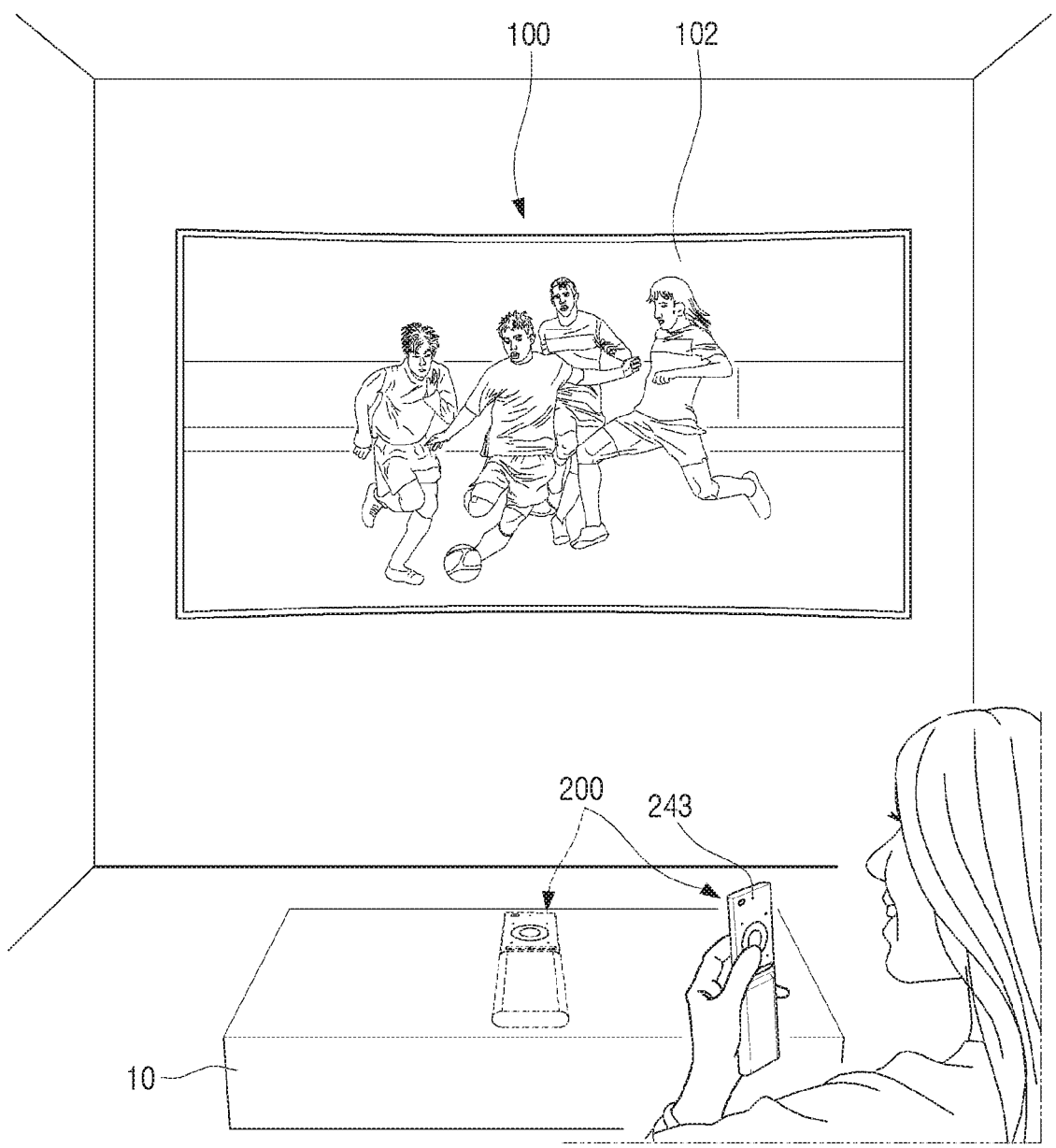

Referring to FIG. 4H, a screen of the display device 100 may be changed in accordance with the uttered user voice (e.g., soccer). The controller 210 of the remote controller 200 may transmit an electrical signal corresponding to the stored user voice to the display device 100 through the communication interface 230. When part of electrical signals corresponding to user voices are stored in the storage 280, the controller 210 of the remote controller 200 may transmit the part of the electrical signals corresponding to user voices to the display device 100 directly (or 100 ms, changeable) or through the communication interface 230.

The controller 210 of the remote controller 200 may transmit (or convert and transmit) an electrical signal corresponding to the stored user voice to the display device 100 according to the wireless communication standard. In addition, the controller 210 of the remote controller 200 may control the communication interface 230 to transmit a packet including a signal corresponding to the stored user voice. The packet may be a packet in conformity with the Near Field communication standard.

When the packet is received from the remote controller 200, the controller 110 of the display device 100 may store the received packet in the storage 180.

The controller 110 of the display device 100 may analyze (or parse) the received packet. According to the result of analyzing the packet, the controller 110 of the display device 100 may determine to receive a signal corresponding to a user voice.

The controller 110 of the display device 100 may transmit the received packet to a voice recognition server through the communication interface 130. The controller 110 of the display device 100 may transmit the received packet itself or convert the received packet and transmit the converted packet to the voice recognition server.

The controller of the voice recognition server may perform voice recognition based on a voice recognition algorithm with respect to the received packet. The voice recognition algorithm may divide a packet into intervals to have a predetermined length, and analyze the voice of each interval and extract parameter including frequency spectrum and voice power. The voice recognition algorithm may divide a packet into phonemes and recognize phonemes based on the parameter of the phoneme unit.

The storage of the voice recognition server may store (update) phoneme database corresponding to a specific phoneme. The controller 310 of the voice recognition server 300 may generate voice data by using the recognized phoneme and the stored database.

The controller of the voice recognition server may recognize a waveform of the received packet and generate voice data. The controller of the voice recognition server may convert voice data into control information (e.g., a control command). The control information may control an operation (or a function) of the display device 100. The voice recognition server may include control information database.

The voice recognition server may convert the converted voice data into control information (e.g., information parsed by the controller 110 of the display device 100) based on the control information database. For example, when a user voice (e.g., an analog waveform corresponding to 'volume up') is received, the display device 100 may transmit an electrical signal (e.g., a digital signal, an analog signal or a packet) corresponding to a user voice to the voice recognition server through the communication interface.

The voice recognition server may convert the received electrical signal (or a packet) into voice data (e.g., 'soccer') through voice recognition. The voice recognition server may convert (or generate) voice data into control information.

When the display device 100 receives the control information, the controller 110 of the display device 100 may display a soccer content (or a soccer channel) based on the control information corresponding to the voice data.

At step S350 of FIG. 3, when a control command corresponding to a user voice is transmitted to a display device, receiving a user voice of a remote controller may be terminated.

The methods according to embodiments of the present disclosure may be implemented in the form of program commands that can be executed through various computer means and recorded in a computer-readable medium. The computer-readable medium may include program commands, data files, data structures, and the like, alone or in combination. For example, the computer-readable medium may be volatile storage or non-volatile storage such as ROM regardless of whether it is erasable or rewritable, a memory such as RAM, memory chip, device and integrated circuit, or a storage medium readable by a machine (e.g., a computer) as well as being optically or magnetically recordable such as CD, DVD, magnetic disk or magnetic tape.

Moreover, the computer-readable program may be stored in a computer-readable storage medium of a server, and the computer program may be downloaded to a computing device via a network.

It should be understood that the memory that is included within the remote controller and/or the display device is an example of programs containing commands for embodying embodiments of the present disclosure or a machine-readable storage medium suitable for storing programs. The program commands recorded on the medium may be those specially designed and configured for the present disclosure or may be available to those skilled in the art of computer software.

Although embodiments have been shown and described, it will be appreciated by those skilled in the art that changes may be made to these embodiments without departing from the principles and spirit of the present disclosure. However, the technical range of the present disclosure is not limited to the detailed description of the specification but defined by the range of the claims but it will be understood by those of skill in the art that various changes in form and details may be made without departing from the spirit and scope of the invention as set forth in the following claims.

What is claimed is:

1. A remote controller for controlling an external device by using voice recognition, the remote controller comprising:
 a microphone;
 at least one sensor;
 a communication interface; and
 a processor configured to control the microphone, the at least one sensor, and the communication interface,
 wherein the processor is further configured to:
 obtain first information from the at least one sensor,
 receive second information indicating a preference settings interface for guiding a user input is displayed on a display of the external device from the external device through the communication interface,
 identify, after receipt of the second information indicating the preference settings interface is displayed, a user utterance intention based on a combination of the first information obtained from the at least one sensor and the second information received from the external device, the first information obtained from the at least one sensor being based on a state of the remote controller or an external state identified by the at least one sensor,
 control, after identification of the user utterance intention, power to be supplied to the microphone based on the user utterance intention being identified, and
 control the communication interface to transmit an electrical signal corresponding to a user voice received through the microphone to the external device.

2. The remote controller as claimed in claim 1, wherein the at least one sensor comprises a plurality of sensors, and
 wherein the processor is further configured to identify the user utterance intention by combining states identified by the plurality of sensors corresponding to a distance between the remote controller and a face of a user.

3. The remote controller as claimed in claim 1, wherein the second information received from the external device includes third information about whether a pop-up guide for guiding a user to utter the user voice is displayed on the display of the external device.

4. The remote controller as claimed in claim 1, wherein the second information received from the external device includes third information about a user utterance history corresponding to a content displayed on the display of the external device.

5. The remote controller as claimed in claim 1, wherein the second information received from the external device includes third information about whether a subsequent utterance of a user is predicted.

6. The remote controller as claimed in claim 5, wherein the third information about whether the subsequent utterance of the user is predicted is identified based on at least one from among a previous utterance, contents of a user interface displayed on the display of the external device, or a result of performing an operation or a function of the external device according to the previous utterance.

7. The remote controller as claimed in claim 1, wherein the processor is further configured to, in response to identifying that there is the user utterance intention, supply power to the microphone, control the communication interface, and transmit the user utterance intention to the external device, and
 wherein the external device is configured to display a user interface with a voice recognition guide on the display.

8. The remote controller as claimed in claim 1, wherein the at least one sensor comprises at least one from among a grip sensor configured to identify a gripping of the remote controller, a motion sensor configured to identify a motion of the remote controller, and a gas sensor configured to identify gas from an exhalation of a user.

9. The remote controller as claimed in claim 1, wherein the processor is further configured to receive third information from the external device indicating a usage pattern corresponding to the preference settings interface currently displayed on the external device, and identify the user utterance intention based on a combination of the first information obtained from the at least one sensor and the usage pattern corresponding to the preference settings interface currently displayed on the external device.

10. The remote controller as claimed in claim 1, wherein the at least one sensor comprises a grip sensor configured to identify a gripping of the remote controller.

11. The remote controller as claimed in claim 1, wherein the at least one sensor comprises a gas sensor configured to identify gas from an exhalation of a user.

12. A display device comprising:
 a display;
 a communication interface; and
 a processor configured to control the display and the communication interface,
 wherein the processor is further configured to:
 control the display to display a preference settings interface for guiding a user input,
 obtain first information corresponding to a user's usage pattern obtained based on the preference settings interface,
 receive second information from a remote controller through the communication interface,
 identify, after receipt of the second information from the remote controller, a user utterance intention based on a combination of the first information obtained based on the user's usage pattern with respect to the preference settings interface and the second information received from the remote controller, the second information received from the remote controller being based on a state of the remote controller or an external state identified by at least one sensor of the remote controller, and
 control, after identification of the user utterance intention, power to be supplied to a microphone and the display to display a user interface with a voice recognition guide to be distinguished from the preference settings interface based on the user utterance intention being identified,
 wherein the voice recognition guide is displayed in less than a predetermined time after the identifying of the user utterance intention.

13. The display device as claimed in claim 12, wherein the processor is further configured to control the display to display the user interface with the voice recognition guide indicating the state of the remote controller or the external state available for receiving a voice to be distinguished from the preference settings interface in accordance with the second information received from the remote controller through the communication interface.

14. The display device as claimed in claim 12, wherein the processor is further configured to control the communication interface to transmit an electrical signal corresponding to a user voice received from the remote controller to a voice recognition server, and based on response information or control information being received from the voice recognition server through the communication interface, control the display to display the response information on the display or perform a function based on the control information.

15. A method for receiving a user voice of a remote controller, the method comprising:
communicably connecting to an external device;
obtaining first information from at least one sensor;
receiving second information indicating a preference settings interface for guiding a user input is displayed on a display of the external device from the external device;
identifying, after receipt of the second information indicating the preference settings interface is displayed, a user utterance intention based on a combination of the first information obtained from the at least one sensor and the second information received from the external device, the first information obtained from the at least one sensor being based on a state of the remote controller or an external state identified by the at least one sensor;
supplying, after identification of the user utterance intention, power to a microphone based on the user utterance intention being identified; and
transmitting an electrical signal corresponding to a user voice received through the microphone to the external device.

16. The method as claimed in claim 15, wherein the identifying the user utterance intention comprises receiving the first information obtained from the at least one sensor and receiving the second information from the external device.

17. The method as claimed in claim 16, wherein the first information based on the state of the remote controller is received from within the remote controller by using the at least one sensor or the microphone.

18. The method as claimed in claim 16, wherein the second information received from the external device is received from outside the remote controller by using a pop-up guide displayed on the external device or a user utterance history.

19. The method as claimed in claim 15, further comprising:
transmitting the electrical signal corresponding to the user voice received through the microphone to the external device.

* * * * *